US011281652B2

(12) United States Patent
Sekiguchi et al.

(10) Patent No.: US 11,281,652 B2
(45) Date of Patent: Mar. 22, 2022

(54) IN-VEHICLE DEVICE AND MAP UPDATING SYSTEM

(71) Applicant: CLARION CO., LTD., Saitama (JP)

(72) Inventors: Takaaki Sekiguchi, Tokyo (JP); Atsushi Kubo, Saitama (JP); Jun Ootsuka, Saitama (JP)

(73) Assignee: CLARION CO., LTD., Saitama (JP)

( * ) Notice: Subject to any disclaimer, the term of this patent is extended or adjusted under 35 U.S.C. 154(b) by 343 days.

(21) Appl. No.: 16/474,420

(22) PCT Filed: Dec. 4, 2017

(86) PCT No.: PCT/JP2017/043481
§ 371 (c)(1),
(2) Date: Jun. 27, 2019

(87) PCT Pub. No.: WO2018/179594
PCT Pub. Date: Oct. 4, 2018

(65) Prior Publication Data
US 2019/0347249 A1    Nov. 14, 2019

(30) Foreign Application Priority Data

Mar. 28, 2017  (JP) .............................. JP2017-062055

(51) Int. Cl.
*G06F 16/29* (2019.01)
*G06F 16/23* (2019.01)
(52) U.S. Cl.
CPC .............. *G06F 16/23* (2019.01); *G06F 16/29* (2019.01)

(58) Field of Classification Search
CPC ......... G06F 16/23; G06F 16/29; G01C 21/26; G01C 21/32; G01C 21/387; G08G 1/137; G09B 29/00
See application file for complete search history.

(56) References Cited

U.S. PATENT DOCUMENTS 6,075,467 A * 6/2000 Ninagawa ............... G01C 21/32
340/990
6,970,782 B2 * 11/2005 Watanabe ............... G01C 21/32
340/991

(Continued)

FOREIGN PATENT DOCUMENTS

CN  101449130 B  *  2/2012  ............. G01C 21/32
CN  102368265 A  *  3/2012

(Continued)

OTHER PUBLICATIONS

Japanese Office Action dated Jan. 21, 2020 for the Japanese Patent Application No. 2017-062055.

(Continued)

*Primary Examiner* — Yongjia Pan
(74) *Attorney, Agent, or Firm* — Volpe Koenig

(57) ABSTRACT

An in-vehicle device includes: a storage unit storing map information divided into zones and used at least for screen display; a map drawing unit generating screen information using the map information; a difference detecting unit calculating, as a difference evaluation value, a magnitude of a difference in zone between the map information before update and the map information after update; and a map updating unit determining an order of updating the zones on a basis of a magnitude of the difference evaluation value to update, for each of the zones, the map information stored in the storage unit.

11 Claims, 23 Drawing Sheets

(56) References Cited

U.S. PATENT DOCUMENTS

| | | | | |
|---|---|---|---|---|
| 7,206,660 B2* | 4/2007 | Hashida | ............... | G01C 21/32 340/990 |
| 7,680,593 B2* | 3/2010 | Fujimoto | ............... | G01C 21/32 701/451 |
| 7,840,957 B2* | 11/2010 | Kumashiro | ............... | G06F 8/65 717/173 |
| 8,478,522 B2* | 7/2013 | Ohira | ............... | G01C 21/32 701/450 |
| 8,626,442 B2* | 1/2014 | Ikeuchi | ............... | G01C 21/32 701/532 |
| 8,744,757 B2* | 6/2014 | Choi | ............... | G01C 21/00 701/428 |
| 9,141,372 B1* | 9/2015 | Sarkar | ............... | G01C 21/32 |
| 9,798,740 B2* | 10/2017 | Pfeifle | ............... | G06F 16/2372 |
| 9,970,771 B2* | 5/2018 | Pfeifle | ............... | G01C 21/32 |
| 10,520,318 B2* | 12/2019 | Park | ............... | G06F 17/00 |
| 10,762,073 B2* | 9/2020 | Pfeifle | ............... | G06F 16/273 |
| 2005/0049784 A1* | 3/2005 | Ikeuchi | ............... | G01C 21/32 701/450 |
| 2005/0149257 A1* | 7/2005 | Linkohr | ............... | G09B 29/10 701/450 |
| 2006/0095202 A1* | 5/2006 | Atarashi | ............... | G06F 16/29 701/451 |
| 2006/0122768 A1* | 6/2006 | Sumizawa | ............... | G01C 21/32 701/453 |
| 2007/0156759 A1* | 7/2007 | Sekine | ............... | G01C 21/32 |
| 2007/0213929 A1* | 9/2007 | Tanizaki | ............... | G01C 21/32 701/451 |
| 2007/0282524 A1* | 12/2007 | Tanizaki | ............... | G09B 29/10 340/995.12 |
| 2007/0294684 A1* | 12/2007 | Kumashiro | ............... | G06F 8/65 717/168 |
| 2008/0033639 A1* | 2/2008 | Nakamura | ............... | G01C 21/32 701/532 |
| 2008/0249705 A1* | 10/2008 | Matsuda | ............... | G01C 21/32 701/532 |
| 2009/0187336 A1* | 7/2009 | Kawamata | ............... | G01C 21/32 701/532 |
| 2010/0114482 A1 | 5/2010 | Nambata et al. | | |
| 2010/0274469 A1* | 10/2010 | Takahata | ............... | G06F 16/29 701/532 |
| 2010/0274472 A1* | 10/2010 | Sakai | ............... | G01C 21/32 701/532 |
| 2010/0332120 A1* | 12/2010 | Tomobe | ............... | G06F 16/29 701/533 |
| 2011/0106431 A1* | 5/2011 | Tomobe | ............... | G01C 21/32 701/533 |
| 2011/0191285 A1 | 8/2011 | Sawai | | |
| 2011/0282575 A1* | 11/2011 | Masuda | ............... | G01C 21/32 701/533 |
| 2013/0006925 A1* | 1/2013 | Sawai | ............... | G06F 16/29 707/609 |
| 2013/0013557 A1* | 1/2013 | Kunath | ............... | G01C 21/32 707/609 |
| 2016/0364224 A1* | 12/2016 | Tuukkanen | ............... | G06F 8/656 |

FOREIGN PATENT DOCUMENTS

| | | | | |
|---|---|---|---|---|
| FR | 3065802 A1 | * | 11/2018 | ............ G01C 21/32 |
| JP | 2000-036097 A | | 2/2000 | |
| JP | 2002032773 A | * | 1/2002 | |
| JP | 2005-345727 A | | 12/2005 | |
| JP | 2008-032644 A | | 2/2008 | |
| JP | 2011-158339 A | | 8/2011 | |
| JP | 5096804 B2 | * | 12/2012 | |
| JP | 2015-191028 A | | 11/2015 | |
| JP | 2015191028 A | * | 11/2015 | |
| JP | 6312493 B2 | * | 4/2018 | |
| WO | 2017/010126 A1 | | 1/2017 | |

OTHER PUBLICATIONS

Extended European Search Report dated Nov. 3, 2020 for European Patent Application No. 17903169.5.

Japanese Office Action dated Aug. 25, 2020 for Japanese Patent Application No. 2017-062055.

International Search Report for PCT/JP2017/043481, dated Jan. 23, 2018.

* cited by examiner

FIG. 4
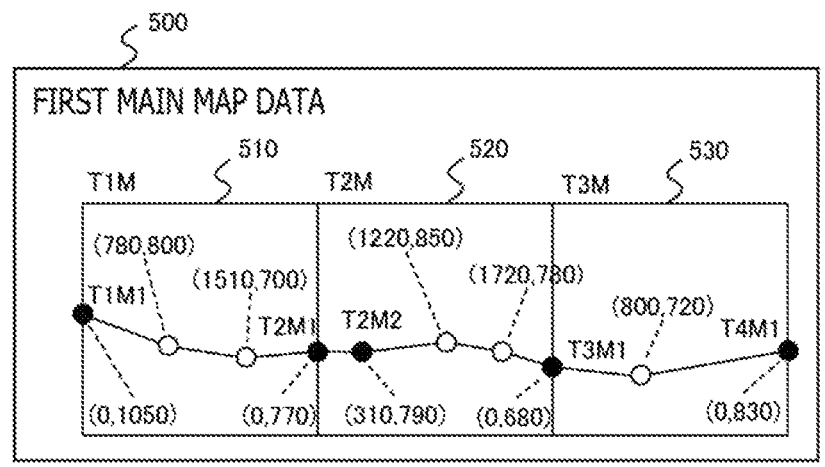
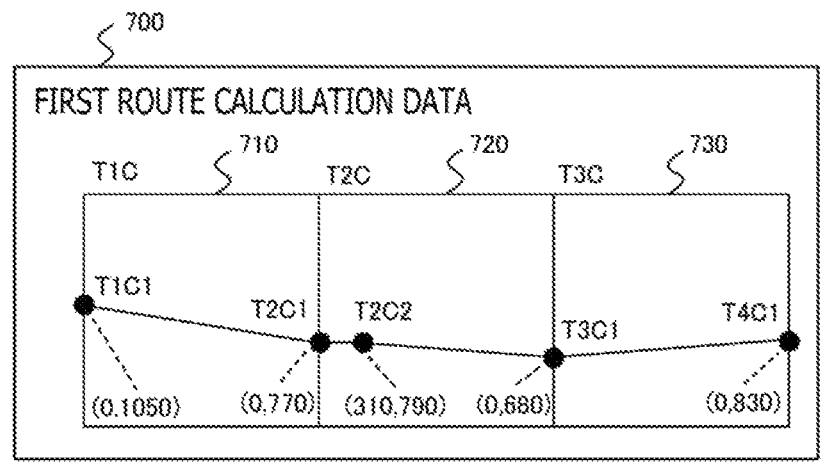

FIG.6
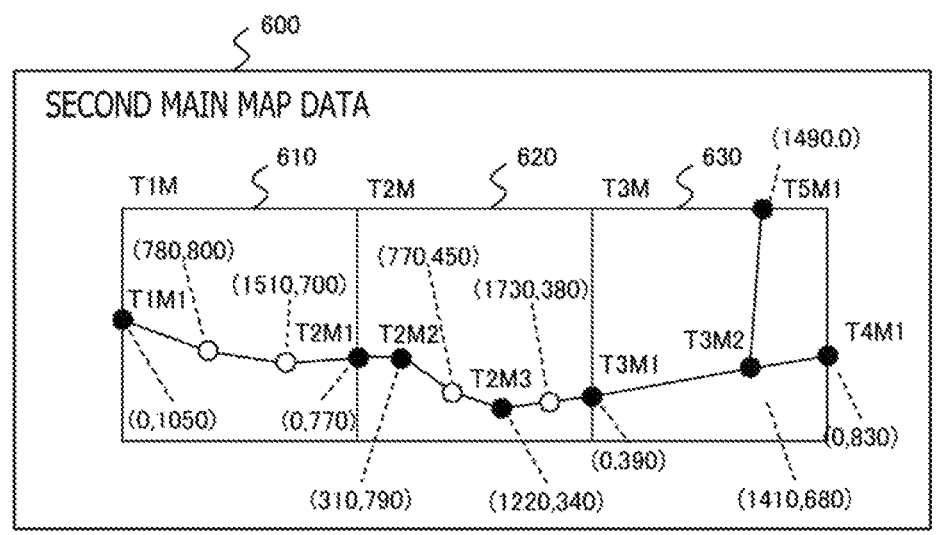
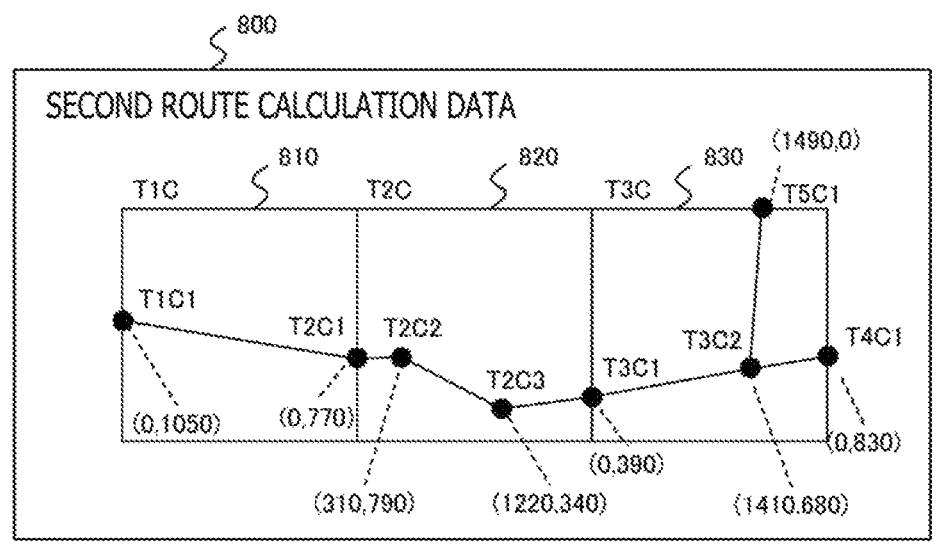

FIG. 7

SECOND MAIN MAP DATA (600)

610
| LINK 1 | | |
|---|---|---|
| START POINT NODE | T1M1 (0,1050) | |
| END POINT NODE | T2M1 (0, 770) | |
| ATTRIBUTE | (NONE) | |
| INTERPOLATION POINT | 780, 800 | |
| INTERPOLATION POINT | 1510, 700 | |

620
| LINK 1 | START POINT NODE | T2M1 (0, 770) |
|---|---|---|
| | END POINT NODE | T2M2 (310, 790) |
| | ATTRIBUTE | (NONE) |
| LINK 2 | START POINT | T2M2 (310, 790) |
| | END POINT | T2M3 (1220, 340) |
| | ATTRIBUTE | (NONE) |
| | INTERPOLATION POINT | 770, 450 |
| LINK 3 | START POINT NODE | T2M3 (1220, 340) |
| | END POINT NODE | T3M1 (0, 290) |
| | ATTRIBUTE | (NONE) |
| | INTERPOLATION POINT | 1730, 380 |

630
| LINK 1 | START POINT NODE | T3M1 (0, 390) |
|---|---|---|
| | END POINT NODE | T3M2 (1410, 680) |
| | ATTRIBUTE | DESTINATION SIGN |
| LINK 2 | START POINT NODE | T3M2 (1410, 680) |
| | END POINT NODE | T4M1 (0, 830) |
| | ATTRIBUTE | (NONE) |
| LINK 3 | START POINT NODE | T3M2 (1410, 680) |
| | END POINT NODE | T5M1 (1490, 0) |
| | ATTRIBUTE | (NONE) |

SECOND ROUTE CALCULATION DATA (800)

810
| T1C1 | COORDINATES | 0, 1050 |
|---|---|---|
| | ADJACENT NODE | T2C1 |

820
| T2C1 | COORDINATES | 0, 770 |
|---|---|---|
| | ADJACENT NODE | T1C1 |
| | ADJACENT NODE | 2 |
| T2C2 | COORDINATES | 310, 790 |
| | ADJACENT NODE | T2C1 |
| | ADJACENT NODE | T2C3 |
| T2C3 | COORDINATES | 1220, 340 |
| | ADJACENT NODE | T2C2 |
| | ADJACENT NODE | T3C1 |

830
| T3C1 | COORDINATES | 0, 390 |
|---|---|---|
| | ADJACENT NODE | T2C3 |
| | ADJACENT NODE | T3C2 |
| T3C2 | COORDINATES | 1410, 680 |
| | ADJACENT NODE | T3C1 |
| | ADJACENT NODE | T4C1 |
| | ADJACENT NODE | T5C1 |

FIG.8

VERSION MANAGEMENT TABLE (900)

| DATA TYPE (901) | ZONE (902) | VERSION (903) |
|---|---|---|
| ROUTE CALCULATION DATA | — | 1 |
| MAIN MAP DATA | T1M | 1 |
| MAIN MAP DATA | T2M | 1 |
| MAIN MAP DATA | T3M | 1 |
| | | |

FIG.9

ROUTE DATA — 410

| ZONE (411) | NODE (P) (412) | COORDINATES (C) (413) |
|---|---|---|
| T1C | T1C1 | 0, 1050 |
| T2C | T2C1 | 0, 770 |
|  | T2C2 | 310, 790 |
|  | T2C3 | 1220, 340 |
| T3C | T3C1 | 0, 390 |
|  | T3C2 | 1410, 680 |
| T4C | T4C1 | 0, 830 |

FIG.10
ROUTE CALCULATION DATA
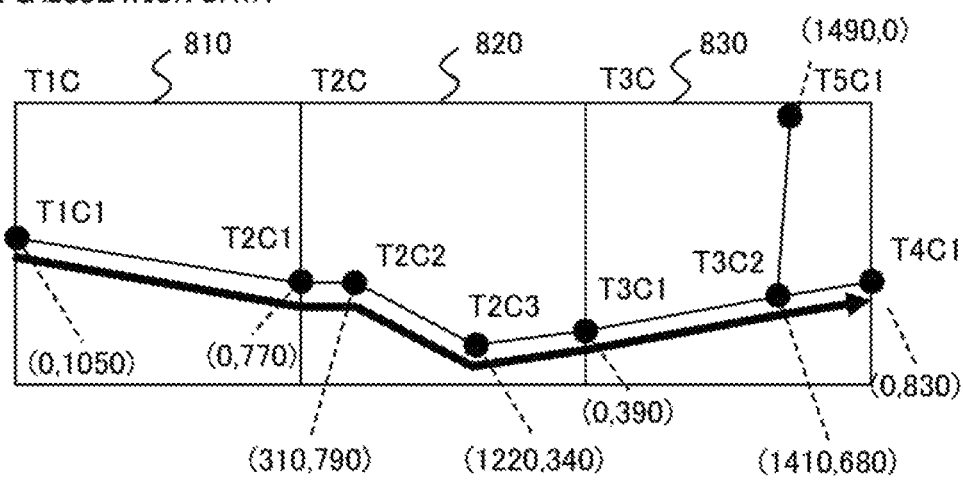
MAIN MAP DATA
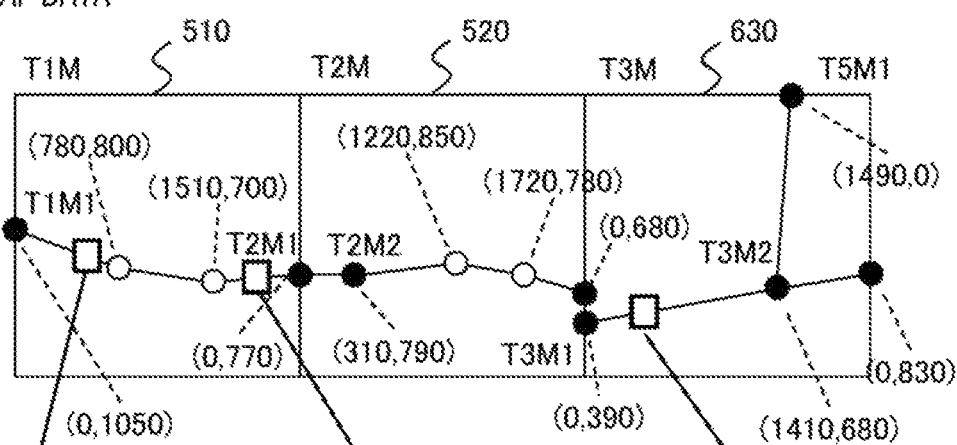
DISPLAY CONTENTS
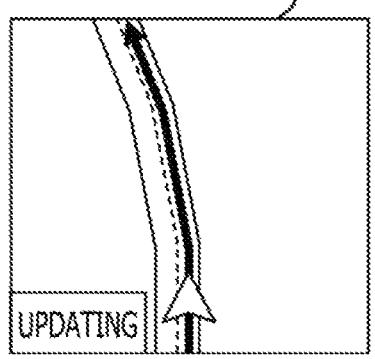
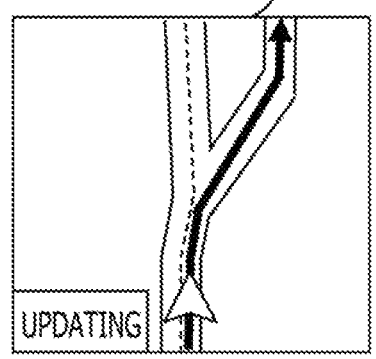
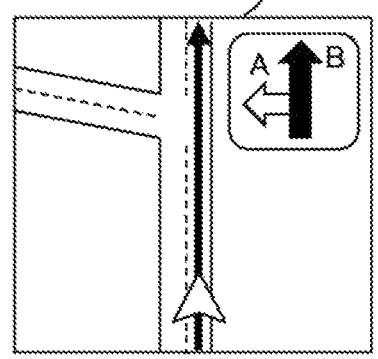

FIG.14

| ZONE | PROCESS NODE (P) | NEIGHBOR NODE (Q) | DISTANCE (L) | BRANCHING DIFFERENCE (B) | NODE DIFFERENCE (D) | DIFFERENCE EVALUATION VALUE |
|---|---|---|---|---|---|---|
| T1 | T1C1 | T1M1 | 0 | 0 | 0 | 0 |
| T2 | T2C1 | T2M1 | 0 | 0 | 0 | 895 |
|  | T2C2 | T2M2 | 0 | 0 | 0 |  |
|  | T2C3 | T3M1 | 895 | 0 | 895 |  |
| T3 | T3C1 | T3M1 | 290 | 0 | 290 | 1345 |
|  | T3C2 | T4M1 | 655 | 2 | 1055 |  |
|  |  |  |  |  |  |  |

FIG.21

VERSION MANAGEMENT TABLE 910

| DEVICE | ZONE | VERSION |
| --- | --- | --- |
| MAP DISTRIBUTION SERVER 200A | — | 2 |
| NAVIGATION DEVICE 100A | T1M | 1 |
| | T2M | 1 |
| | T3M | 2 |
| NAVIGATION DEVICE 100A | T1M | 1 |
| | T2M | 1 |
| | T3M | 1 |

FIRST ROUTE CALCULATION DATA

710

| T1C1 | COORDINATES | 0, 1050 |
|---|---|---|
| | ADJACENT NODE | T2C1 |
| | TRAFFIC ATTRIBUTE: ROAD TYPE | NATIONAL ROAD |
| | TRAFFIC ATTRIBUTE: SPEED LIMIT | 40 km/h |
| | TRAFFIC ATTRIBUTE: PASSAGE | STRAIGHT THROUGH ONLY |

∗
∗
∗

IN-VEHICLE DEVICE AND MAP UPDATING SYSTEM

TECHNICAL FIELD

The present invention relates to an in-vehicle device and a map updating system.

BACKGROUND ART

A car navigation system is a device referencing map data stored in storage to provide guide information to a driver. For the car navigation system to reference latest map data for guidance, it is desirable to connect the car navigation system and a map distribution server together via a smartphone, a communication unit, or the like to allow distribution of the latest map data through communication. Thus, techniques for reducing the amount of communication data have been devised.

Patent Document 1 discloses a map update data supplying device including: an updating map database performing, for each of zones, version management on update data files for difference update of a map database and storing the update file for each version for each zone; request update data extracting means for extracting, on the basis of an update request from the navigation device, request update zones that are zones to be difference-updated, and extracting, for each of the request update zones, the update data files for a latest version and preceding versions, the update data files being to be supplied to the navigation device; guarantee update data extracting means for extracting, in a case where all the request update zones have been updated up to the latest version, guarantee update zones that are zones needing to be updated to guarantee continuity of a road network between adjacent zones, and extracting, for each of the guarantee update zones, the update data files for an update guarantee version and preceding versions, the update guarantee version being a version needing to be updated to guarantee the continuity of the road network; integrated data generating means for integrating, for each of the request update zones extracted by the request update data extracting means, all the update data files for the latest version and the preceding versions for each request update zone to generate a request updating integrated data file that is a data file for one difference update, and integrating, for each of the guarantee update zones extracted by the guarantee update data extracting means, the update data files for the update guarantee version and the preceding versions for each of the guarantee update zones to generate a guarantee updating integrated data file that is a data file for one difference update; and integrated data supplying means for supplying the navigation device with the request updating integrated data file and the guarantee updating integrated data file generated by the integrated data generating means.

PRIOR ART DOCUMENT

Patent Document

Patent Document 1: JP-2011-158339-A

SUMMARY OF THE INVENTION

Problem to be Solved by the Invention

The invention described in Patent Document 1 does not take into account the use of a map before completion of update of the map.

Means for Solving the Problem

An in-vehicle device according to a first aspect of the present invention includes a storage unit storing map information divided into zones and used at least for screen display, a map drawing unit generating screen information using the map information, a difference detecting unit calculating, as a difference evaluation value, a magnitude of a difference in zone between the map information before update and the map information after update, and a map updating unit determining an order of updating the zones on a basis of a magnitude of the difference evaluation value to update, for each of the zones, the map information stored in the storage unit.

A map updating system according to a second aspect of the present invention is a map updating system including a navigation device mounted in a vehicle and a distribution server distributing information to the navigation device. The navigation device includes a current map storage unit storing map information divided into zones and used at least for screen display, a map drawing unit generating screen information using the map information, and a map updating unit updating, for each of the zones, the map information stored in the current map storage unit. The distribution server including a latest map storage unit storing latest map information used to update the map information. An order of updating the zones used when the map updating unit updates the map information is determined on a basis of a difference evaluation value indicative of a magnitude of a difference between the map information before update and the map information after update.

Effect of the Invention

According to the present invention, the zones are updated in order of decreasing difference in zone between the map information before update and the map information after update, enabling a reduction in a possible adverse effect of incomplete update when screen information is generated before the update is completed.

BRIEF DESCRIPTION OF THE DRAWINGS

FIG. 4 is a conceptual diagram illustrating information included in first main map data 500 and first route calculation data 700.

FIG. 6 is a diagram illustrating recording contents of second main map data 600 and second route calculation data 800.

FIG. 7 is a diagram illustrating configurations of the second main map data 600 and the second route calculation data 800.

FIG. 8 is a diagram illustrating a configuration of a version management table 900.

FIG. 9 is a diagram illustrating an example of route data 410.

FIG. 10 is a diagram illustrating a map displayed on a display unit 103.

FIG. 14 is a diagram illustrating a calculation process for difference data 420.

FIG. 21 is a diagram illustrating a configuration of a version management table 910 in the second embodiment.

FIG. 23 is a diagram illustrating an example of first route calculation data 700A in a third embodiment.

MODES FOR CARRYING OUT THE INVENTION

First Embodiment

With reference to FIGS. 1 to 16, a first embodiment of a map updating system will be described below.

Figure 1:
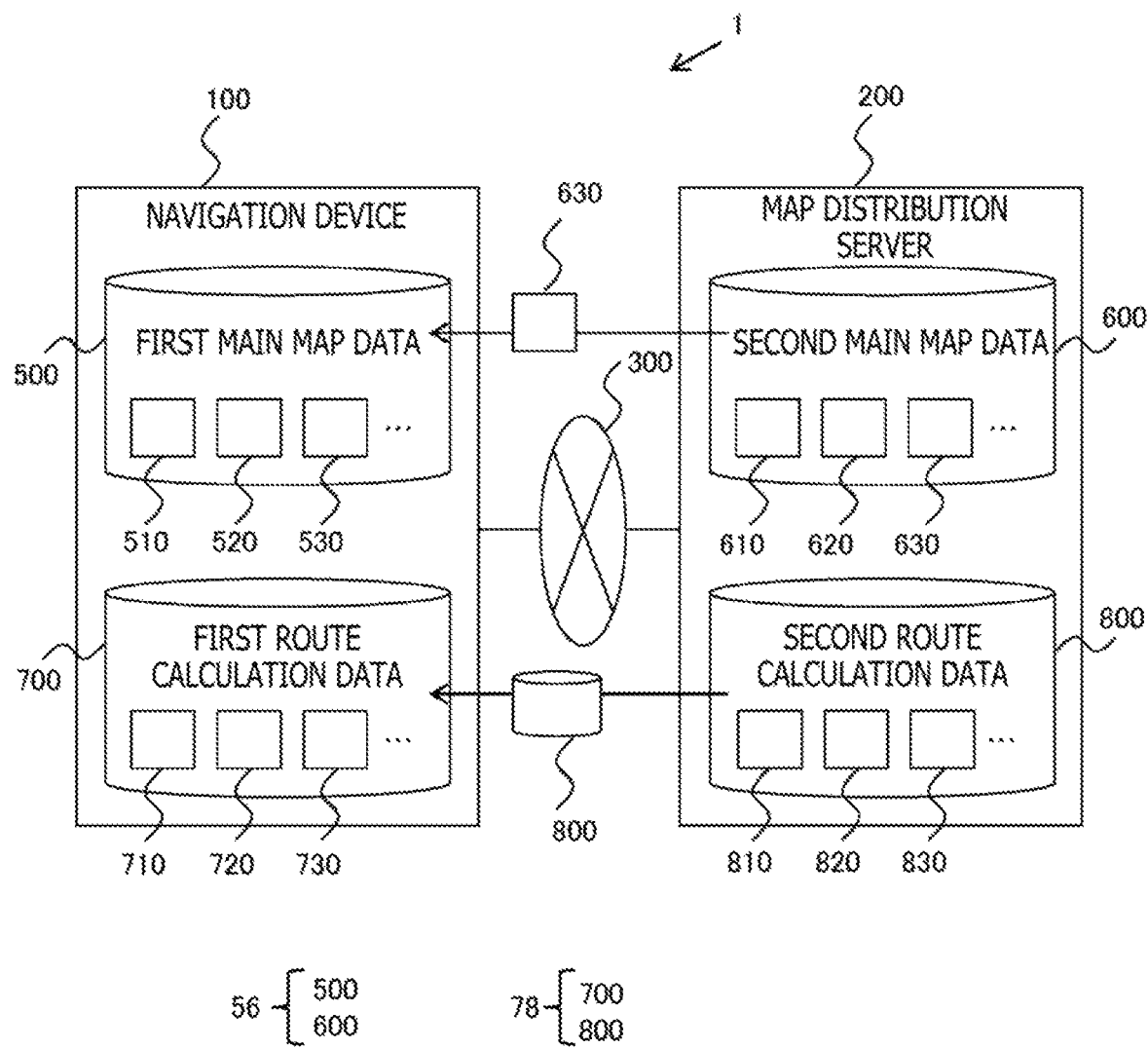
FIG. 1 is a diagram illustrating an outline of a map updating system 1 in a first embodiment.

FIG. 1 is a diagram illustrating an outline of a map updating system 1 in the first embodiment. The map updating system 1 includes a navigation device 100 and a map distribution server 200 that are connected together via a communication network 300. In the present embodiment, a person operating the navigation device 100 is referred to as a "user." The navigation device 100 is a car navigation device mounted in a vehicle to display a traveling route to a destination on a display unit described below on the basis of the user's operation. Furthermore, the vehicle in which the navigation device 100 is mounted is referred to as an "own vehicle." FIG. 1 illustrates only one navigation device 100. However, a plurality of navigation devices 100 can be connected to the map distribution server 200. However, the map distribution server 200 executes similar processing on all the navigation devices 100, and thus, in the description of the present embodiment, one navigation device 100 is connected to the map distribution server 200.

The navigation device 100 calculates a traveling route to a destination to display the route on a display unit described below while drawing a map of a predetermined range, particularly a map of surroundings of a user's own vehicle. Route calculation data used to calculate a traveling route and main map data used to draw a map are updated with information distributed by the map distribution server 200. That is, the same type of data involves old and new data, and thus, "first" and "second" are added for distinction between the old and new data. That is, the navigation device 100 includes first main map data 500 and first route calculation data 700, and the map distribution server 200 includes second main map data 600 and second route calculation data 800. The first main map data 500 and the second main map data 600 are hereinafter collectively referred to as main map data 56. The first route calculation data 700 and the second route calculation data 800 are hereinafter collectively referred to as route calculation data 78.

The main map data 56 and the route calculation data 78 are each divided into predetermined zones. The zones in the main map data 56 geographically match the zones in the route calculation data 78. The first main map data 500 is composed of divisional data 510, 520, and 530 and the like. The first route calculation data 700 is composed of divisional data 710, 720, and 730 and the like. The second main map data 600 is composed of divisional data 610, 620, and 630 and the like. The second route calculation data 800 is composed of divisional data 810, 820, and 830 and the like. At this time, the same geographical range of information is stored in the divisional data 510, the divisional data 610, the divisional data 710, and the divisional data 810. Furthermore, the divisional data 510 is updated with the divisional data 610, and the divisional data 710 is updated with the divisional data 810.

The first main map data 500 and the second main map data 600 are data used, for example, to display a map of a traveling route. The second main map data 600 reflects the latest information compared to the first main map data 500. Thus, the first main map data 500 is overwritten with the second main map data 600 to update the main map data of the navigation device 100. Furthermore, as described below, the main map data is separately updated on a zone-by-zone basis as described below.

The first route calculation data 700 and the second route calculation data 800 are data used, for example, to calculate the route. The second route calculation data 800 reflects the latest information compared to the first route calculation data 700. Thus, the first route calculation data 700 is overwritten with the second route calculation data 800 to update the route calculation data of the navigation device 100. However, the route calculation data is entirely updated at a time instead of being updated on a zone-by-zone basis.

The main map data 56 and the route calculation data 78 are each divided into predetermined zones. The zones in the main map data 56 geographically match the zones in the route calculation data 78. Specifically, the same geographical range of information is stored in the divisional data 510 of the first main map data 500, the divisional data 710 of the first route calculation data 700, the divisional data 610 of the second main map data 600, and the divisional data 810 of the second route calculation data 800. For example, when divisional data 630 of the second main map data 600 is transmitted from the map distribution server 200 to the navigation device 100 as illustrated in FIG. 1, the divisional data 530 of the first main map data 500 is updated. However, as described above, the route calculation data 78 is entirely updated at a time instead of being updated on a zone-by-zone basis.

Figure 2:
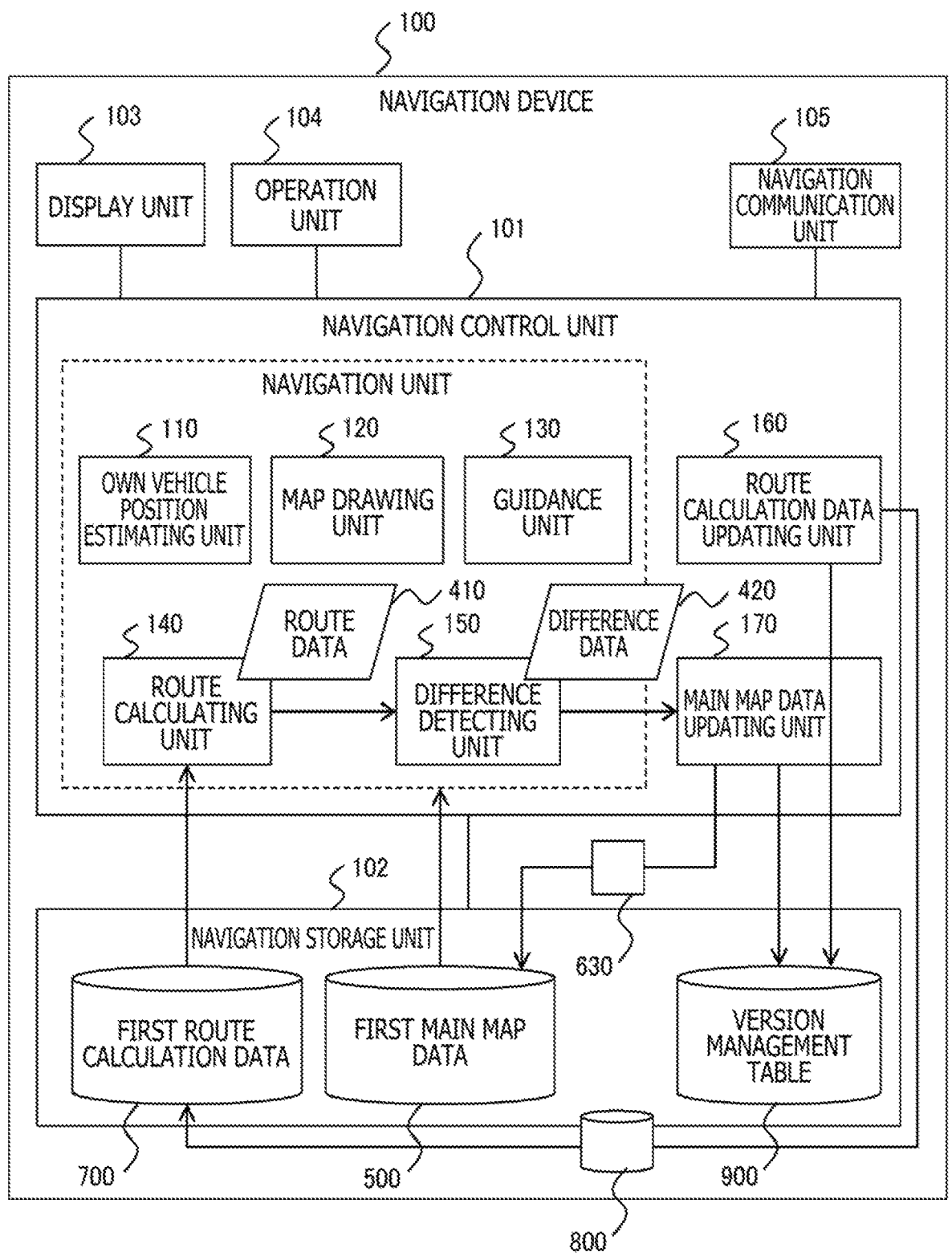
FIG. 2 is a diagram of a configuration of a navigation device 100.

FIG. 2 is a diagram of a configuration of the navigation device 100. The navigation device 100 includes a navigation control unit 101 executing a series of processes regarding navigation, a navigation storage unit 102 storing the first route calculation data 700, the first main map data 500, and the version management table 900, a display unit 103 displaying and presenting a navigation screen to the user, an operation unit 104 accepting an input of a destination and the like from the user, a navigation communication unit 105 for communication with the map distribution server 200, an own vehicle position estimating unit 110 estimating a position of the own vehicle, and the map drawing unit 120 drawing, for example, a map of surroundings of the position of the own vehicle. The navigation device 100 further includes: a guidance unit 130 providing information about the surroundings of the own vehicle and information along the route for guidance; a route calculating unit 140 calculating a route from the position of the own vehicle to the destination to output route data 410; the difference detecting unit 150 comparing the route data 410 with the first main map data 500 to detect a difference; a route calculation data updating unit 160 acquiring the second route calculation data 800 from the map distribution server 200 to save the second route calculation data 800 to the navigation storage unit 102; and a main map data updating unit 170 acquiring the second main map data 600 from the map distribution server 200 in units of zones and saving the second main map data 600 to the navigation storage unit 102.

The navigation control unit 101 includes a CPU, a ROM, and a RAM that are not illustrated. The CPU expands, into the RAM, a program stored in the ROM, and executes the program to implement operations described below. The navigation storage unit 102 is a nonvolatile, rewritable storage area, for example, a flash memory or a hard disk. The display unit 103 is, for example, a liquid crystal display. The operation unit 104 is, for example, a plurality of buttons. However, the display unit 103 and the operation unit 104 may be integrally configured as a touch panel. The following may be configured to be implemented as dedicated hardware or as software modules executed by the navigation control unit 101: the own vehicle position estimating unit 110, the map drawing unit 120, the guidance unit 130, the route calculating unit 140, the difference detecting unit 150, the route calculation data updating unit 160, and the main map data updating unit 170.

The version management table 900 will be described below in detail. Version information is used to update and manage the main map data 56 and the route calculation data 78, and the version management table 900 stores version numbers of the first main map data 500 and the first route calculation data 700. The main map data 56 and the route calculation data 78 are closely associated with each other, and the version number of the main map data 56 is linked with the version number of the route calculation data 78. For example, the first main map data 500 and the first route calculation data 700 are both of version "1" before update and of version "2" when update of both data is all completed.

Figure 3:
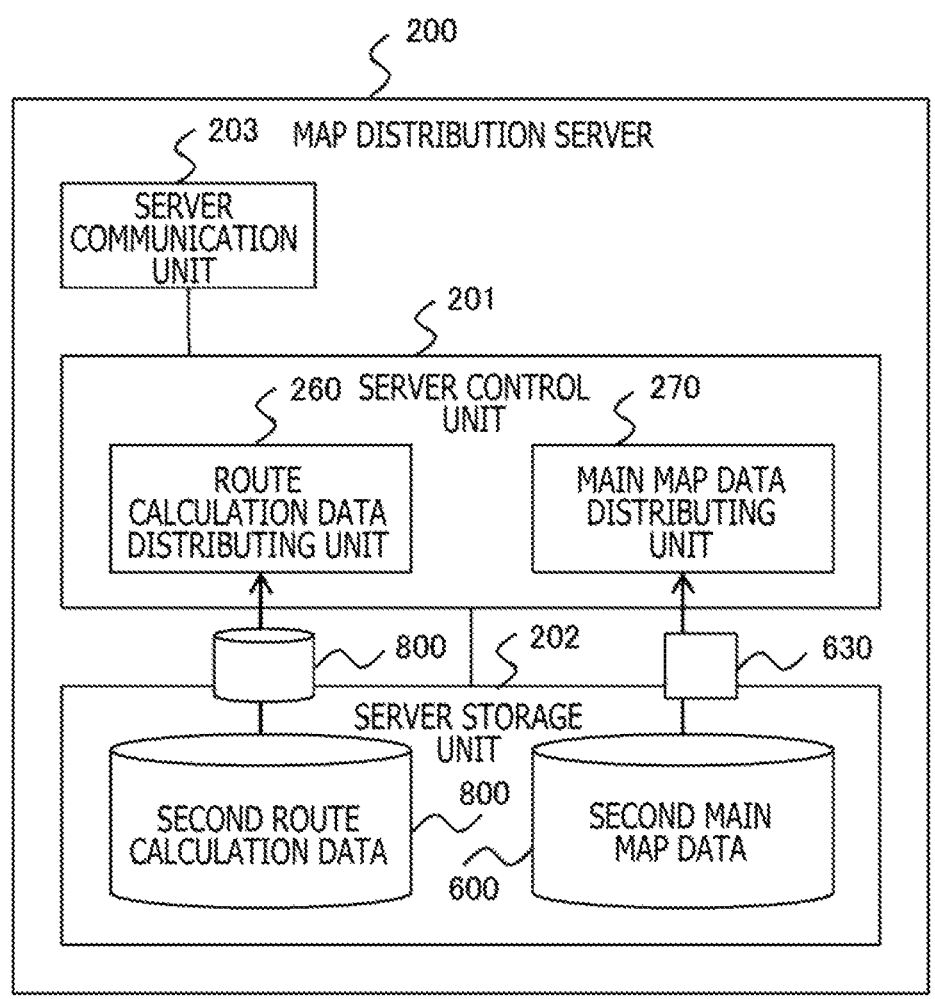
FIG. 3 is a diagram of a configuration of a map distribution server 200.

FIG. 3 is a diagram of a configuration of the map distribution server 200. The map distribution server 200 includes: a server control unit 201 executing a series of processes for distributing map data; a server storage unit 202 storing the second route calculation data 800 and the second main map data 600; a server communication unit 203 for communication with the navigation device 100; a route calculation data distributing unit 260 distributing the second route calculation data 800 to the navigation device 100; and a main map data distributing unit 270 distributing the second main map data to the navigation device 100 in units of zones.

The server control unit 201 includes a CPU, a ROM, and a RAM that are not illustrated. The CPU expands, into the RAM, a program stored in the ROM, and executes the program to implement operation described below. The server storage unit 202 is a nonvolatile and rewritable storage area such as a flash memory or a hard disk. The route calculation data distributing unit 260 and the main map data distributing unit 270 may be configured to be implemented as dedicated hardware or as software modules executed by the server control unit 201.

FIG. 4 is a conceptual diagram illustrating information included in the first main map data 500 and the first route calculation data 700 stored in the navigation device 100. Data configurations corresponding to these data will be described using FIG. 5 described below. FIG. 4 illustrates three zones T1 to T3 constituting the first main map data 500 and the first route calculation data 700. "M" and "C" are added for distinction to indicate whether the data of interest is the first main map data 500 or the first route calculation data 700. That is, FIG. 4 illustrates three zones T1M510, T2M520, and T3M530 included in the first main map data 500, and three zones T1C710, T2C720, and T3C730 constituting the first route calculation data 700. In the figure, solid lines denote links, filled circles denote nodes, and blank circles denote interpolation points. Here, the nodes refer to point data including attribute information. For the main map data 56 and the route calculation data 78 of the same version, the nodes present in one of those are also present in the other one.

In FIG. 4, the reference numerals illustrated above the nodes are names identifying the nodes, and serial numbers within the zones are added to zone names. In the present embodiment, the node present at the boundary between the zones is assumed to belong to the right zone. On the other hand, the interpolation points refer to point data including only coordinates and are used to indicate the shape (curve or the like) of a road. For the main map data 56, interpolation points are recoded that are used to draw a map and to estimate the position of the own vehicle. On the other hand, for the route calculation data 78, no interpolation points are recorded because the shape of a road is not necessarily essential for route calculation.

Figure 5:
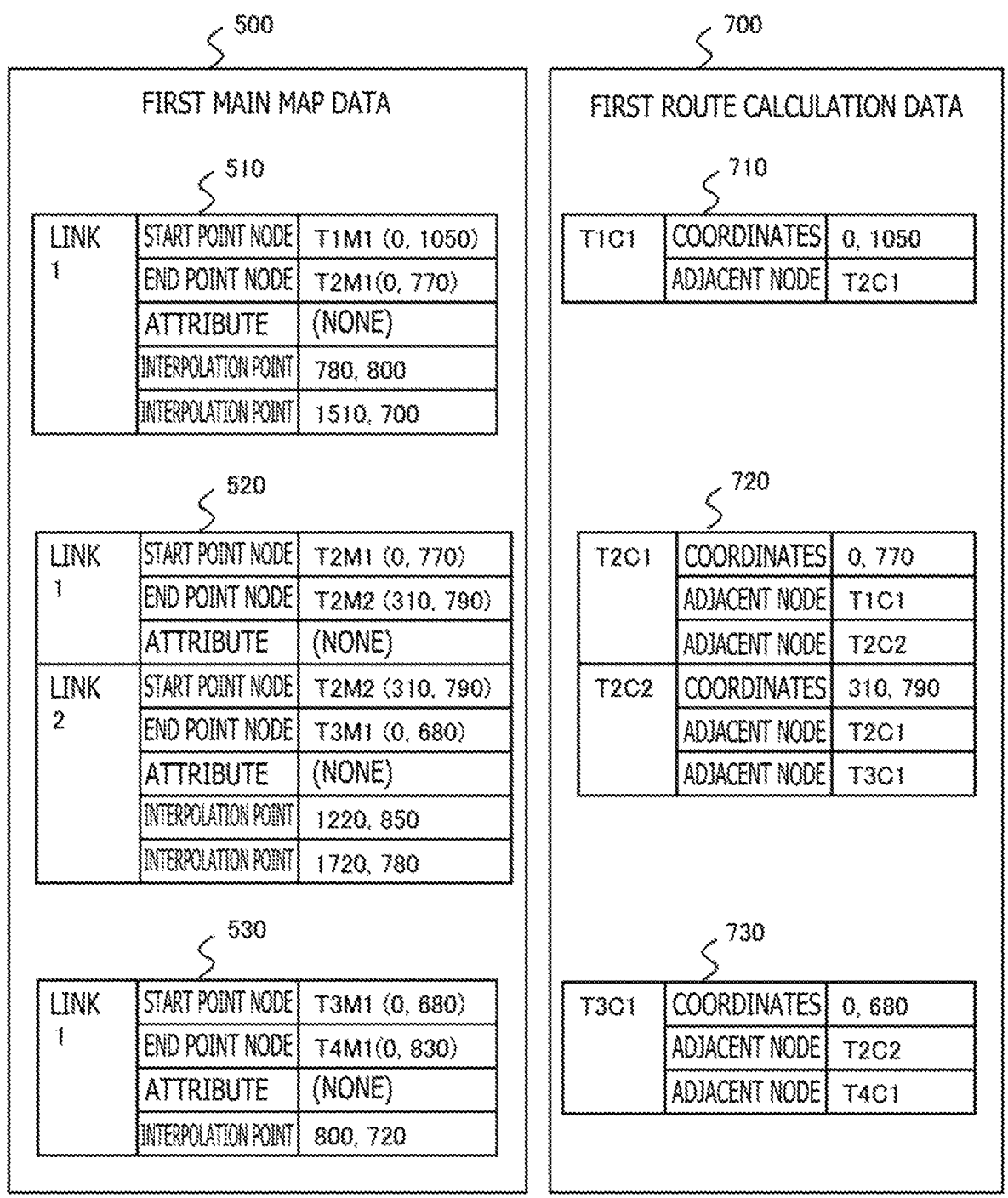
FIG. 5 is a diagram illustrating configurations of the first main map data 500 and the first route calculation data.

FIG. 5 is a diagram illustrating configurations of the first main map data 500 and the first route calculation data illustrated in FIG. 4. For the first main map data 500, link information for each zone is stored. For example, data 510 for a zone T1M indicates that the zone T1M includes one link, that is, only a link 1. Each link includes information about a start point node, an end point node, an attribute, and a plurality of consecutive interpolation points. For the start point node and the end point node, names and coordinates of the nodes are stored. The coordinates are represented in a form "(X coordinate, Y coordinate)." For values of coordinates, for example, the coordinates of a lower left point of a zone are (0, 0), and the coordinates of an upper right point of the zone are (2048, 2048).

The attribute refers to a speed limit for a road corresponding to the link and information to be provided for guidance for the road, for example, text or voice information indicative of destinations of branch routes and images of signposts installed on the road. The attributes of the links constituting the first main map data 500 are unnecessary for description of the present example and are thus omitted. The interpolation points are coordinates for indicating the shape of a link as described above. The link 1 of the zone T1 is shaped like a polygonal line represented by the coordinates (0, 1050) of the start point node, the coordinates (780, 800) of an interpolation point, the coordinates (1510, 700) of an interpolation point, and the coordinates (0, 770) of the end point node. However, the coordinates (0, 770) of the end point node indicate coordinates in an adjacent zone T2M, and in terms of the zone T1M, the coordinates of the end point node correspond to (2048, 770).

For the first route calculation data 700, node information for each zone is stored. For example, data 710 about the zone T1 indicates that the zone T1 includes one node, that is, only a node T1C1. Each node includes coordinates within the zone of the node and information about one or more adjacent nodes. The coordinates of the node are represented and defined as described above.

The adjacent node represents an adjacent node that can be reached from the node of interest. For the node T1C1 of the zone T1C, there is represented that this node is connected to a node T2C1 of the zone T2C. For calculation of the shortest route, a cost for reaching the adjacent node is included in the route calculation data. However, the cost is unnecessary for description of the present example and is thus omitted. The cost as used herein is typically determined with a traveling time and the like taken into account.

FIG. 6 is a diagram illustrating recording contents of the second main map data 600 and the second route calculation data 800 stored in the map distribution server 200. Entries to the figure such as nodes and links are as described for FIG. 4 and are thus omitted. Compared to the first main map data 500 illustrated in FIG. 4, the second main map data 600 is such that the road in the zone T2M includes an additional node and is displaced downward in the figure. This leads to the coordinates of a node T3M1 being changed from (0, 680) to (0, 390). Furthermore, the zone T3M includes an additional road extending upward from a node T3M2 in the figure. In accordance with the change in the main map data, the second route calculation data 800 has been changed from the first route calculation data 700 illustrated in FIG. 4.

FIG. 7 is a diagram illustrating configurations of the second main map data 600 and the second route calculation data 800 illustrated in FIG. 6. The configurations of the second main map data 600 and the second route calculation data 800 are as described for FIG. 5 and are thus omitted. Stored information is also basically as described for FIG. 6 and is thus omitted. However, the link 1 of the zone T3C includes "destination sign" set as an attribute. The "destination sign" means that a sign describing a destination following a branch exists at an intersection indicated by the end point node of the link 1. Although not illustrated in FIG. 7, information indicated by the sign, for example, image information about the sign, is also stored.

FIG. 8 is a diagram illustrating a configuration of the version management table 900 stored in the navigation device 100. The version management table 900 stores version numbers of the zones in the first main map data 500 and a version number of the first route calculation data 700. The version management table 900 is composed of a plurality of records. Each record is composed of fields of a data type 901, a zone 902, and a version 903. The records constituting the version management table 900 include one record corresponding to the first route calculation data 700 and a plurality of records corresponding to the zones in the first main map data 500.

For example, in a case where the first main map data 500 is composed of ten zones, the version management table 900 has eleven record. The fields of the zone 902 each store nothing in a case where the data type 901 is the route calculation data, and store the name of the zone in a case where the data type 902 is the main map data. This is because, although the first route calculation data 700 is also composed of a plurality of zones, all the zones in the first route calculation data 700 are updated at a time, eliminating a need for zone-by-zone management. The fields of the version 903 each store a version number. The version number is, for example, a number starting with 1, and a larger value of the version number represents a newer version. The version management table 900 is updated by the route calculation data updating unit 160 and the main map data updating unit 170.

(Route Data)

FIG. 9 is a diagram illustrating an example of the route data 410 generated by the route calculating unit 140. The route data 410 is composed of a zone 411, a node 412, and coordinates 413. The nodes constituting the route along which the own vehicle travels are stored in the route data 410, in the order in which the own vehicle travels through the nodes. An example depicted in FIG. 9 illustrates a route starting with the node T1C1 of the zone T1 and ending with a node T4C1 of a zone T4.

(Screen Display)

With reference to FIG. 10, a map will be described that is displayed on the display unit 103 by the map drawing unit 120 in a situation where the first main map data 500 is partially not updated. The map drawing unit 120 mainly draws the shape of a road using the first main map data 500 and draws a traveling route using the route data 410. In an example described below, only the zone T3M in the first main map data 500 has been updated, and all the zones in the first route calculation data 700 have been completely updated. In other words, the information illustrated in FIG. 5 is stored in the zone T1M and the zone T2M in the first main map data 500. The information illustrated in FIG. 7 is stored in the zone T3M in the first main map data 500 and in the entire first route calculation data 700. Screen display will be described below that is provided at points described below when the own vehicle travels with update of the first main map data 500 suspended due to a problem with communication or the map distribution server 200. A technique will be described below that is used to determine the order in which the zones in the first main map data 500 are updated.

An upper part of FIG. 10 illustrates the first route calculation data 700 in the above-described situation and the traveling route. As described above, the first route calculation data 700 in FIG. 10 has been updated and is thus the same as the second main map data 600 illustrated in FIG. 7. In the upper part of FIG. 10, a thick line indicates the traveling route, and the vehicle travels from T1C1 at a left end in the figure through T2C1, T2C2, . . . , and T3C2 to T4C1. A middle part of FIG. 10 indicates the first main map data 500 in the above-described situation. As described above, the information illustrated in FIG. 5 is stored in the zone T1M and the zone T2M, and the information illustrated in FIG. 7 is stored in the zone T3M. Furthermore, three squares in the middle part of FIG. 10 indicate points where display is provided on the display unit 103.

Screens 103A to 103c illustrated in a lower part of FIG. 10 depict maps of the road in the traveling direction from three points illustrated in the middle part of FIG. 10, that is, maps of the right sides, in the figure, of the respective points. The screen displays the road in the zone T1M. Since the data has not been updated yet as described above, the map drawing unit 120 uses the first main map data 500 before update to draw the road, and uses the route data 410 to draw the traveling route. The map drawing unit 120 uses the information about the interpolation points for the link included in the first main map data 500 to draw the detailed shape of the road. Furthermore, the map drawing unit 120 detects that a non-updated zone is included in a range of the first main map data 500 represented as a map using a technique described below, and provides display indicating that update is being performed, for example, displays characters "updating."

The screen 103B displays the road in the zone T2M. The map drawing unit 120 uses the first main map data 500 before update to draw a road extending through a substantial center of the screen 103B to connect an upper side and a lower side of the screen 103B. Furthermore, for a reason described below, the map drawing unit 120 uses the route data 410 to add a road extending upward and rightward in the screen 103B and draws a route in the added road. The added road corresponds to a segment connecting nodes T2C2, T2C3, and T3C1 in the zone T2C in the upper part of FIG. 10. The added road is drawn using no geometric points and is thus only schematically expressed. However, the traveling direction of the vehicle can be matched with the traveling direction in the screen 103B, and thus, drawing of the corresponding road on the screen 103B allows convenience for the user to be improved. Moreover, the map drawing unit 120 detects a non-updated zone included in the drawn range of the first main map data 500, and provides display indicating that update is being performed, for example, displays the characters "updating."

The screen 103C displays a road in the zone T3M. The map drawing unit 120 uses the first main map data 500 after update to draw a road and further draw a destination sign that is the attribute of the link 1 of the zone T3M. Furthermore, the map drawing unit 120 uses the route data 410 to draw a route. The first main map data 500 for the zone T3M is significantly changed after update. However, as described below, the first main map data 500 for the zone T3M is updated before the first main map data 500 for the zone T1M and the zone T2M, and thus, the zone T3M is drawn using the updated data.

(Operational Sequence)

Figure 11:
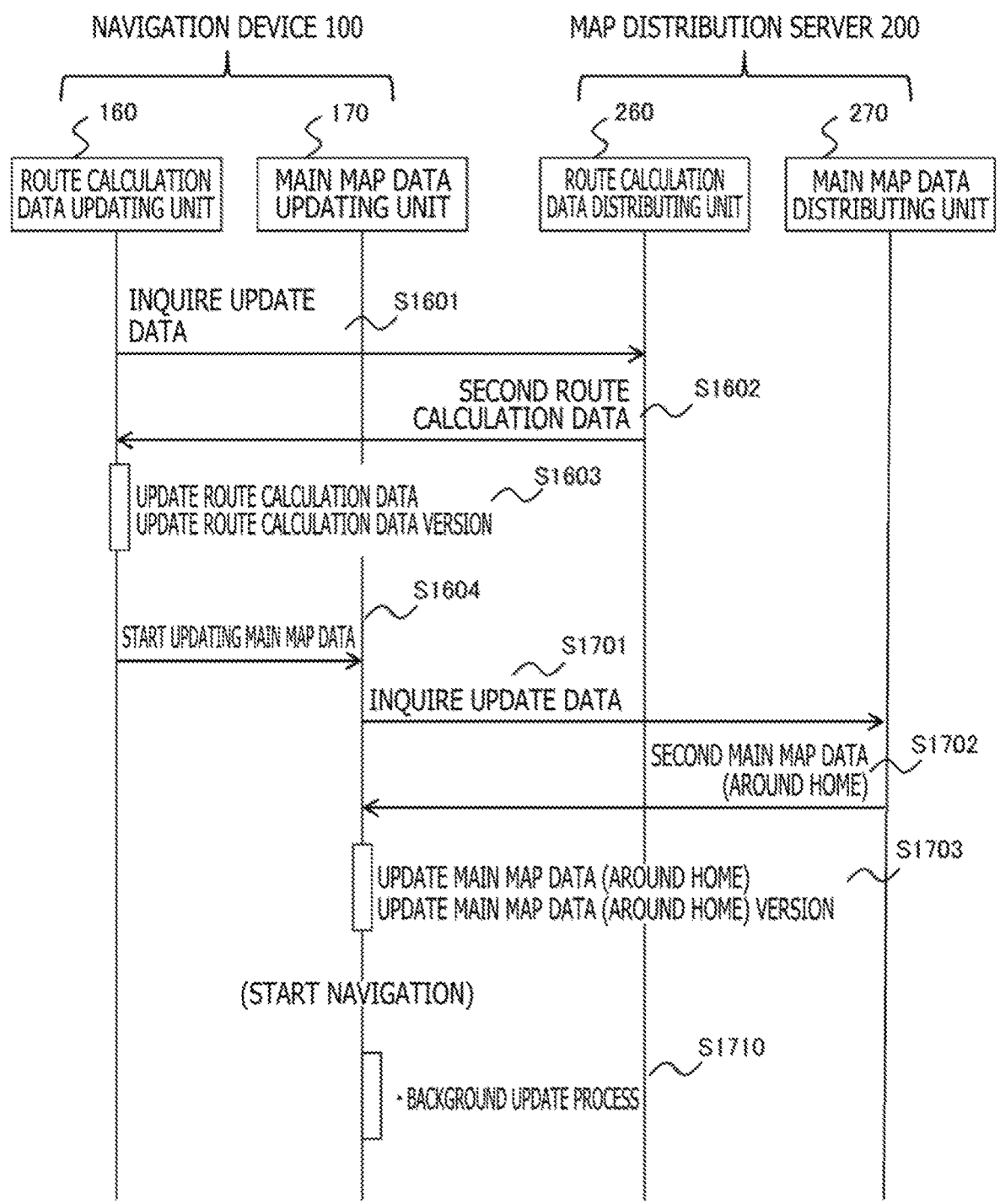
FIG. 11 is a diagram of an operational sequence of operations during activation of the navigation device 100.

FIG. 11 is a diagram illustrating an operational sequence executed when the navigation device 100 is activated. When the navigation device 100 is activated by turning on an ignition switch of the own vehicle, the route calculation data updating unit 160 inquires of the route calculation data distributing unit 260 of the map distribution server as to whether the route calculation data is to be updated (step S1601). Specifically, for example, the navigation device 100 transmits the current version number of the first route calculation data 700. The route calculation data distributing unit 260 having received this inquiry distributes, in a case where a new version of the second route calculation data 800 is available, the data to the navigation device 100 (step S1602). The route calculation data updating unit 160 writes the received second route calculation data 800 to the navigation storage unit 102 to update the first route calculation data 700, thus updating the version of the route calculation data in the version management table 900 (step S1603).

The route calculation data updating unit 160 subsequently instructs the main map data updating unit 170 to start updating the main map data (step S1604). The main map data updating unit 170 receives this update start instruction and then inquires of the main map data distributing unit 270 of the map distribution server 200 as to whether the main map data is to be updated (step S1701). Then, in a case where any update data (second main map data 600) is available, the main map data distributing unit 270 distributes data about some of the zones needed to execute navigation, for example, data about a zone including the user's home, to the navigation device 100 (step S1702). Then, the main map data updating unit 170 writes the received second main map data 600 to the navigation storage unit 102 to update the first main map data 500 and updates the version of the updated zone in the version management table 900 (step S1703). After the minimum data needed to execute navigation is updated, the navigation device 100 is enabled to perform a navigation operation including drawing of maps. An operation of navigation to a destination set by the user is started.

In parallel with the navigation operation, an updating process for the remaining main map data (hereinafter referred to as "background update of the main map data") is continued in a background (step S1710). As described below, the navigation operation affects an updating process for the main map data. The navigation operation will be described with reference to FIG. 12, and the background update of the main map data will be described with reference to FIG. 15. Even in a case where no destination is set, the updating process for the main map data is continued.

Figure 12:
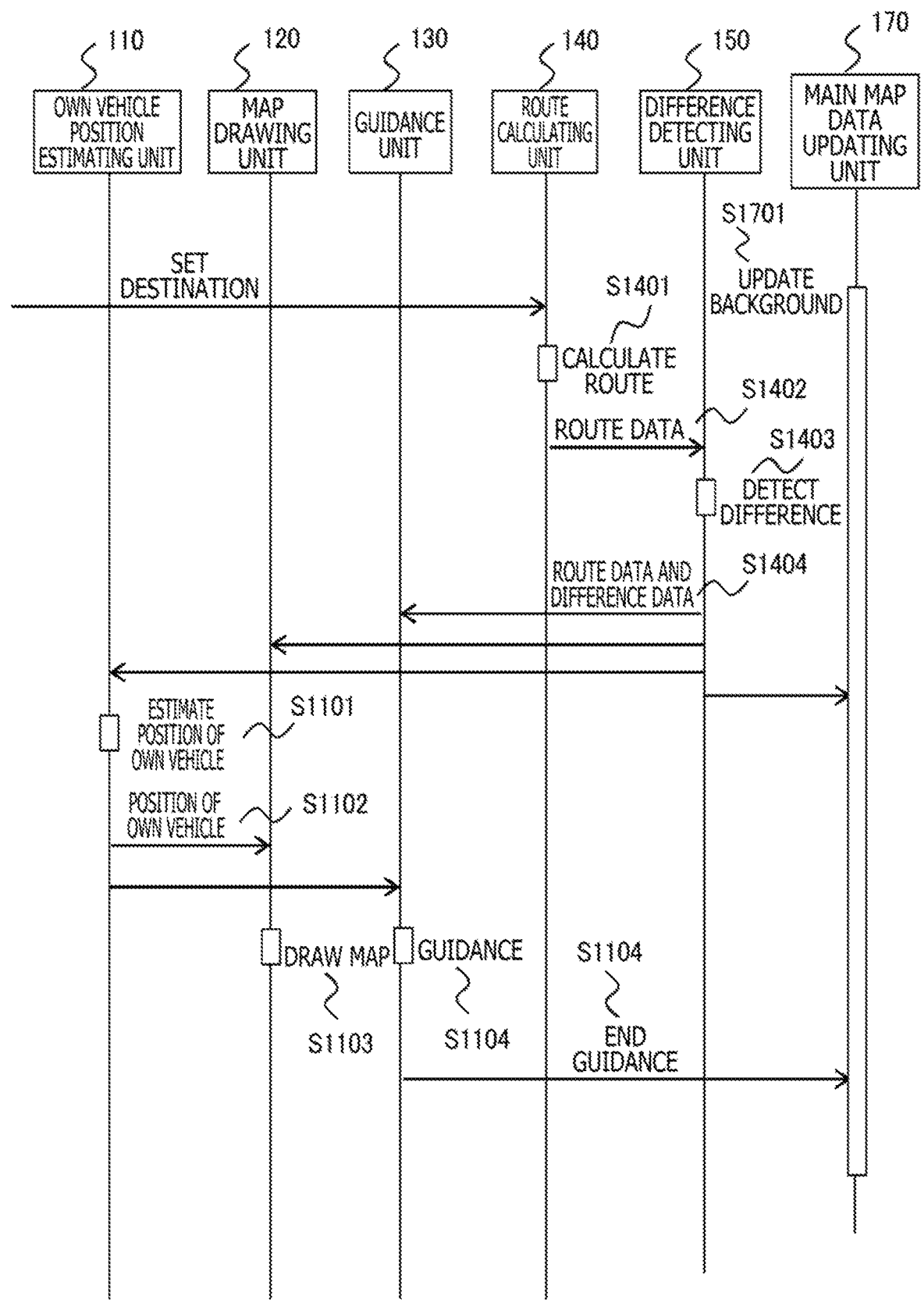
FIG. 12 is a diagram illustrating an entire sequence of a navigation operation.

FIG. 12 is a diagram illustrating an entire sequence of the navigation operation. As described with reference to FIG. 10, update of the first route calculation data 700 is completed before the navigation operation is started. Once the user uses the operation unit 104 of the navigation device 100 or the like to set a destination, the route calculating unit 140 calculates a route from the position of the own vehicle to the destination to generate route data 410 (step S1401). Then, the route calculating unit 140 notifies the difference detecting unit 150 of the route data 410 generated in step S1401 (step S1402). The difference detecting unit 150 having received the notification compares the notified route data 410 with the first main map data 500 to generate difference data 420 (step S1403). A process for generating difference data 420 will be described below with reference to FIG. 13.

Then, the difference detecting unit 150 notifies the route data 410 and the resultant difference data 420 to the own vehicle position estimating unit 110, the map drawing unit 120, the guidance unit 130, and the main map data updating unit 170 (step S1404). Note that, although the main map data updating unit 170 is influenced by the notification from the difference detecting unit 150 as described below, the background update is executed even with no notification from the difference detecting unit 150 (step S1710).

The own vehicle position estimating unit 110 estimates the position of the own vehicle to notify the map drawing unit 120 and the guidance unit 130 of the position of the own vehicle (step S1102). As described below in detail with reference to FIG. 16, the map drawing unit 120 draws a map to be displayed on the screen in accordance with the position of the own vehicle notified by the map drawing unit 120 (step S1103). In a case where information to be provided at the position of the own vehicle for guidance is available, for example, information about a distance to an intersection where a right turn is to be made, the guidance unit 130 displays the information to allow guidance to the destination (step S1104). Furthermore, in a case of determining that the destination has been reached on the basis of a substantial match between the position of the own vehicle and the destination, the guidance unit 130 notifies the main map data updating unit 170 that the guidance has ended.

(Difference Detecting Unit)

Figure 13:
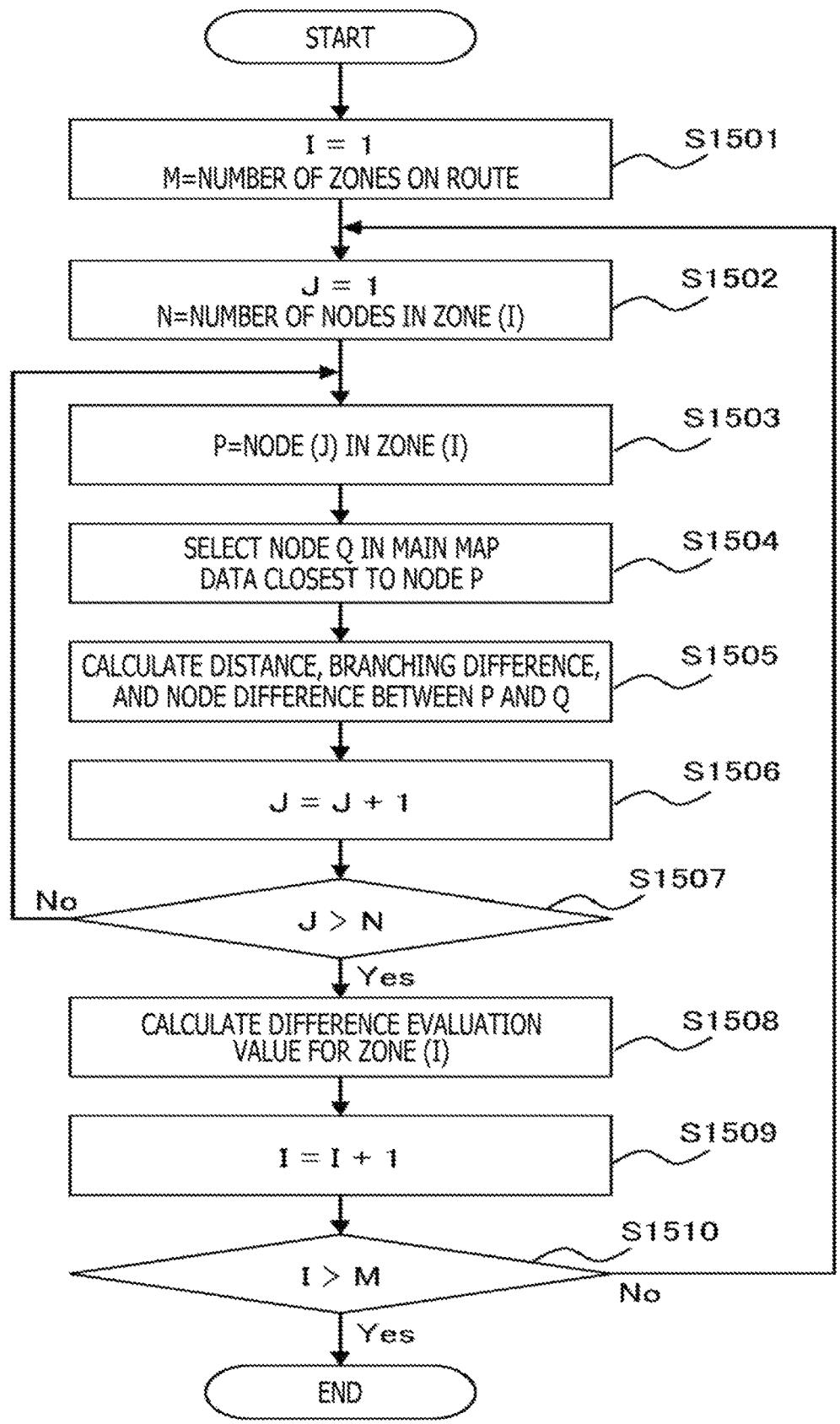
FIG. 13 is a flowchart illustrating a difference detecting process of a difference detecting unit 150.

FIG. 13 is a flowchart illustrating a difference detecting process in which the difference detecting unit 150 generates difference data 420. The CPU of the navigation control unit 101 is mainly responsible for executing the process illustrated in FIG. 13. As described below, the difference detecting unit 150 uses the route data 410 and the first main map data 500 to detect a difference between the first main map data 500 before update and the first main map data 500 after update. This process focuses on the point that the information included in the route data 410 can be considered to be the same as the data of the updated first main map data 500 because the route data 410 is created on the basis of the already updated first route calculation data 700.

The difference detecting unit 150 first stores 1 in a variable I and stores, in a variable M, the number of zones included in the route data 410 (step S1501). The difference detecting unit 150 then stores 1 in a variable J and stores, in a variable N, the number of nodes included in the I-th zone (hereinafter referred to as the zone (I)) present on the route (step S1502). The difference detecting unit 150 then temporarily stores the J-th node of the zone (I) as a process node P (step S1503). That is, the process node P is a node on the route and thus a node on the first route calculation data 700.

The difference detecting unit 150 selects a node on the first main map data 500 located at the shortest distance from the process node P and temporarily stores the node as a neighbor node Q (step S1504). At this time, with the coordinates of a lower left point of the zone T1M in the first main map data 500 assumed to correspond to the coordinates of a lower left point of the zone T1C in the first route calculation data 700, that is, with the distance between the points assumed to be zero, the distance between the node on the first main map data 500 and the node on the first route calculation data 700 is calculated.

The difference detecting unit 150 then calculates, as node differences, the distance between the process node P and the neighbor node Q and a difference in the number of branches between the process node P and the neighbor node Q as described below using FIG. 14 (step S1505). The difference detecting unit 150 then adds 1 to the variable J (step S1506). The difference detecting unit 150 then determines whether the variable J has a value larger than the value of the variable N (step S1507). The difference detecting unit 150 returns to step S1503 to repeat the process in a case of determining that the variable J is not larger than the variable N and calculates a difference evaluation value for the zone (I) as described below in a case of determining that the variable J is larger than the variable N (step S1508). The difference detecting unit 150 then adds 1 to the variable I (step S1509). The difference detecting unit 150 then determines whether the variable I has a value larger than the value of the variable M (step S1510). The difference detecting unit 150 returns to step S1502 to repeat the process in a case of determining that the variable I is not larger than the variable M and ends the difference detecting process in a case of determining that the variable I is larger than the variable M.

The difference data 420 is the difference evaluation value obtained for each zone by the above-described process.

(Example of Calculation of Difference Data)

FIG. 14 is a diagram illustrating a calculation process for the difference data 420 calculated in accordance with the flowchart illustrated in FIG. 13 using the first main map data 500 illustrated in FIG. 4 and FIG. 5 and the second route calculation data 800 illustrated in FIG. 6 and FIG. 7. That is, FIG. 14 illustrates an example in which the route data 410 is calculated using the second route calculation data 800 illustrated in FIG. 6 and FIG. 7. A table illustrated in FIG. 14 is composed of a plurality of records corresponding to the nodes included in the route data 410. Each of the records is composed of fields of a zone 421, a node 422, a neighbor node 423, a distance 424, a branching difference 425, a node difference 426, and a difference evaluation value 427. In the fields of the zone 421 and the node 422, the same values as those in the route data 410 are stored. A node on the first main map data 500 located at the shortest distance from the process node P is stored in the field of the neighbor node 423. For calculation of a distance spanning zones, a coordinate system common to the first main map data 500 and the first route calculation data 700 is set in which the coordinates of the lower left point of the zone T1C or zone T1M are (0, 0) and in which the coordinates of an upper right point of a zone T3C or zone T3M are (6144, 2048). When the value of the distance 424 is denoted as L, L is calculated as an Euclidean distance as in Equation (1).

$$L=\mathrm{SQRT}\ ((X\_P-X\_Q)^2+(Y\_P-Y\_Q)^2) \quad \text{Equation (1)}$$

Note that X_P is an X coordinate of the process node P, X_Q is an X coordinate of the neighbor node Q, Y_P is a Y coordinate of the process node P, and Y_Q is a Y coordinate of the neighbor node Q. Furthermore, SQRT represents calculation of a square root. For example, in a case where the process node P is the node T1C1, the neighbor node Q is a node T1M1 present at the same coordinates, and thus, the distance 424 has a value of zero. Furthermore, in a case where the process node P is a node T3C2, in the first main map data 500, a node T4M1 is located at a shorter distance from the node T3C2 than the node T3M1 as illustrated in FIG. 4 and thus corresponds to the neighbor node Q. A distance L is calculated to be "655."

The branching difference 425 is a difference between the number of nodes adjacent to the process node P and the number of nodes adjacent to the neighbor node Q. The value of the branching difference 425 is denoted as B. B is expressed by Equation (2).

$$B=\mathrm{ABS}\ (\mathrm{NUM}\_P-\mathrm{NUM}\_Q) \quad \text{Equation (2)}$$

Note that NUM_P is the number of nodes adjacent to the process node P, and NUM_Q is the number of nodes adjacent to the neighbor node Q. Furthermore, ABS represents calculation of an absolute value. For example, for the node T3C2, B=2 because NUM_P is 3 and NUM_Q is 1.

The node difference 426 is calculated by weighting the value of the distance 424 and the value of the branching difference 425. For example, the value of the node difference 426 is denoted as D. D is expressed by Equation (3).

$$D=L+W*B \quad \text{Equation (3)}$$

W is a predetermined weight coefficient. In FIG. 14, W=200.

The difference evaluation value 427 is an evaluation value for the differences in each zone and is the sum of values of the node differences 426 between the nodes included in the zone. The difference evaluation value 427 is denoted as EVAL. EVAL is expressed by Equation (4).

$$\mathrm{EVAL}=\Sigma(D) \quad \text{Equation (4)}$$

Σ represents evaluation of the sum for all the nodes included in the zone.

Figure 15:
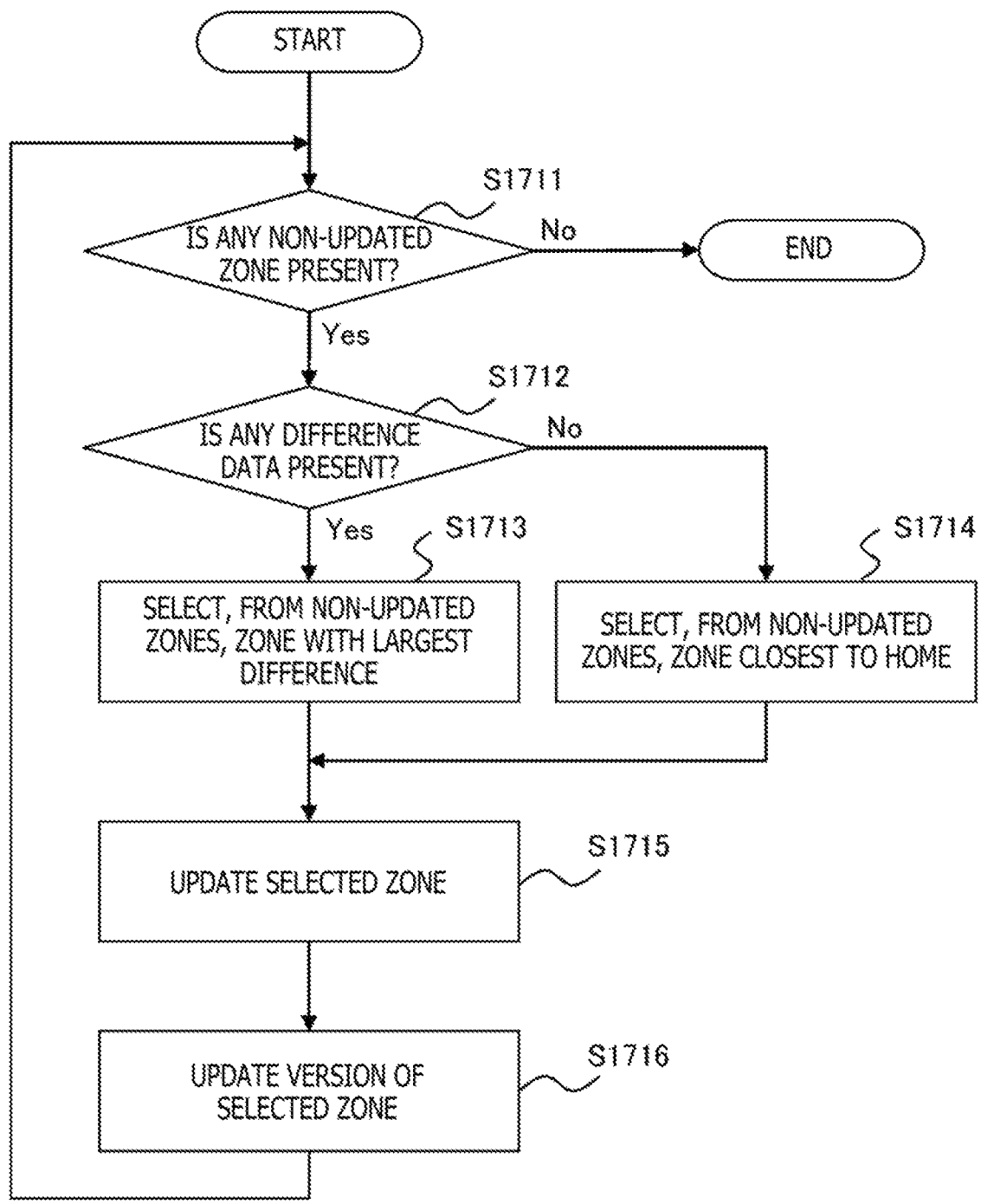
FIG. 15 is a flowchart illustrating a background updating process for main map data executed by a main map data updating unit 170 in a first embodiment.

FIG. 15 is a flowchart illustrating a background updating process for the main map data executed by the main map data updating unit 170. The CPU of the navigation control unit 101 is mainly responsible for executing steps described below. The main map data updating unit 170 first references the version management table 900 to determine whether any non-updated zone is present in the main map data or not (step S1711). Specifically, the main map data updating unit 170 determines that a non-updated zone is present in the main map data in a case where the version management table 900 contains a zone with a version number different from the version of the route calculation data. The main map data updating unit 170 ends the background update in a case of determining that no non-updated zone is present in the main map data, and proceeds to step S1712 to continue the background update in a case of determining that a non-updated zone is present in the main map data.

The main map data updating unit 170 then determines whether any difference data 420 is present in the non-updated zone or not (step S1712). As described above, the difference data 420 is calculated only for the zones included in the route data 410. Furthermore, even the zones included in the route data 410 are treated as containing no difference data 420 once the guidance is completed. In a case of determining that the difference data 420 is present in the non-updated zone, the main map data updating unit 170 selects a zone with the largest difference from the non-updated zone (step S1713). Here, the largest difference means that the difference evaluation value 427 of the difference data 420 takes the largest value. In a case of determining in step S1712 that no difference data 420 is present in the non-updated zone, the main map data updating unit 170 selects a zone closest to the user's home from the non-updated zone (step S1714). Instead of the zone close to the user's home, for example, one optional zone may be simply selected.

When execution of step S1713 or step S1714 is completed, the main map data updating unit 170 acquires, from the main map data distributing unit 270 of the map distribution server 200, the second main map data 600 for the zone selected in step S1713 or step S1714 to update the first main map data 500 in the navigation storage unit 102 (step S1715). The main map data updating unit 170 then updates the version of the zone in the version management table 900 for which the main map data has been updated, and returns to step S1711 (step S1716). The main map data updating unit 170 repeats the above-described process until no non-updated zone is present in the main map data.

Figure 16:
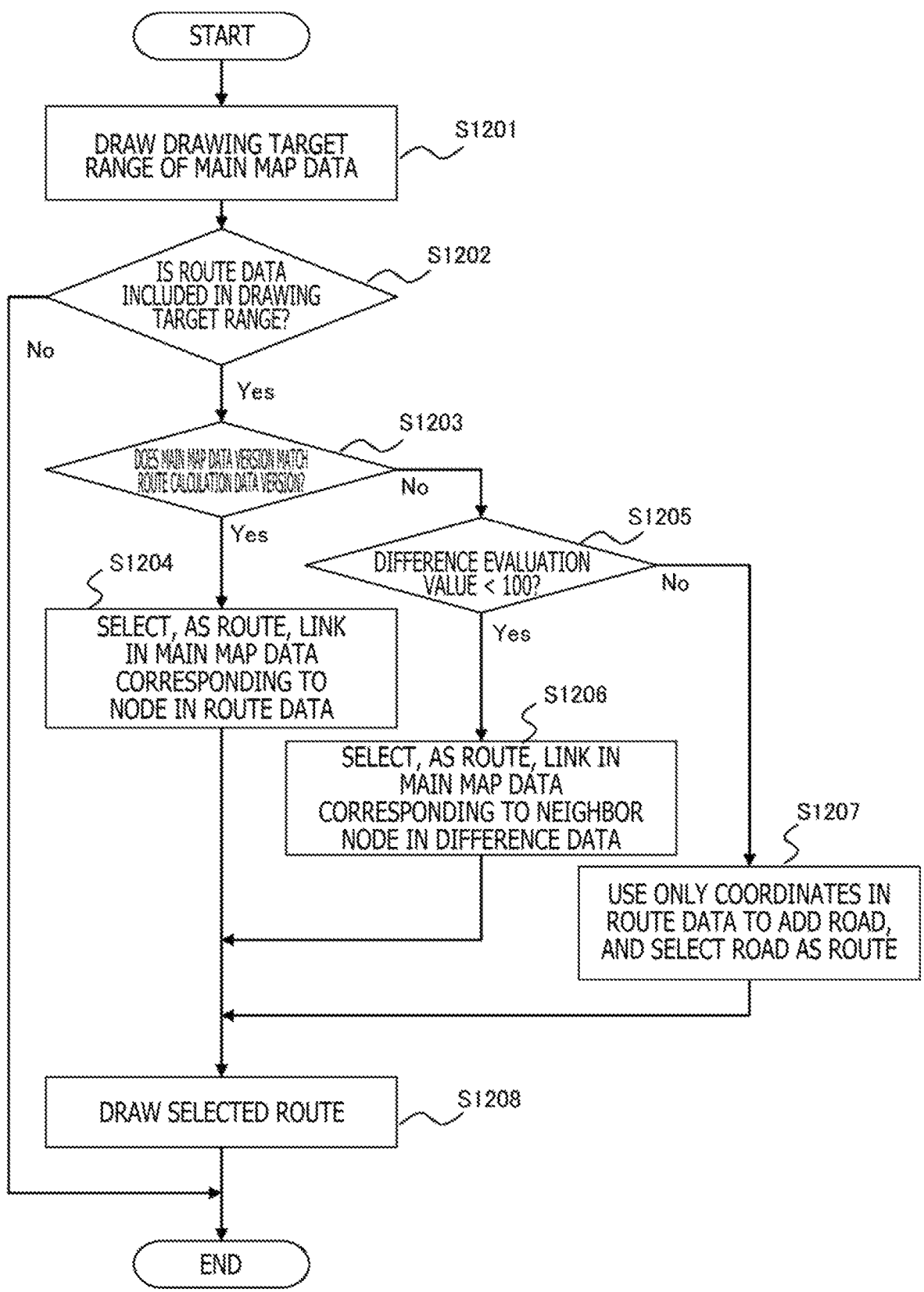
FIG. 16 is a flowchart illustrating operations of a map drawing unit 120.

FIG. 16 is a flowchart illustrating operations of the map drawing unit 120. The map drawing unit 120 determines a drawing target range on the basis of the position of the own vehicle notified by the own vehicle position estimating unit 110, and references the first main map data 500 to draw a map (step S1201). The map drawing unit 120 then determines whether the drawing target range contains any of the nodes included in the route data 410 calculated by the route calculating unit 140 or not (step S1202). In a case of determining that the route data 410 is not included within the drawing range, the map drawing unit 120 ends the drawing process. In a case of determining that the route data 410 is included within the drawing range, the map drawing unit 120 determines whether the version of the first main map data 500 matches the version of the first route calculation data 700 for the drawing target zone or not (step S1203). This determination is made with reference to the version management table 900. In a case of determining that the versions match, the map drawing unit 120 selects, as a route, the link in the main map data corresponding to the node in the route data 410 (step S1204).

In a case of determining in step S1203 that the versions do not match, the map drawing unit 120 determines whether the difference evaluation value 427 for the drawing target zone in the difference data 420 is less than a predetermined value, for example, less than 100 or not (step S1205). In a case of determining that the difference evaluation value 427 is less than the predetermined value, the map drawing unit 120 determines, as the process node P in the difference data 420, a node constituting the route data 410, and selects a corresponding neighbor node Q (step S1206). In a case of determining in the step S1205 that the difference evaluation value 427 is not less than the predetermined value, the map drawing unit 120 uses the coordinates 413 in the route data 410 to add and select a road as a route (step S1207). An example of addition of a road will be described below. The map drawing unit 120 then draws the route selected in one of step S1204, step S1206, and step S1207 (step S1208) and ends the drawing process.

An example of the operations in the flowchart illustrated in FIG. 16 will be described with reference to FIG. 10. Preconditions for the example of operations are assumed to be such that the entire first route calculation data 700 and the zone T3M in the first main map data 500 have been updated and that the zone T1M and the zone T2M in the first main map data 500 have not been updated. Furthermore, the route data 410 is as illustrated in FIG. 9, and the difference data 420 is as illustrated in FIG. 14. Under the preconditions, in drawing of the zone T3M, the version of the first route calculation data 700 matches the version of the first main map data 500 of the zone T3M, and thus, the map drawing unit 120 proceeds to step S1204. Furthermore, in drawing of the zone T1M and the zone T2M, the versions do not match, and thus, the map drawing unit 120 makes the determination in step S1205. For the zone T1M, the map drawing unit 120 makes affirmative determination and proceeds to step S1205. For the zone T2M, the map drawing unit 120 makes negative determination and proceeds to step S1207.

In step S1207, the map drawing unit 120 uses coordinates (0, 770), (310, 790), (1220, 340), and (0, 390) on the route to add a road. However, the last coordinates (0, 390) are coordinates in a zone T4M, and are thus converted into (2048, 390) on the basis of a positional relationship with the zone T3M before processing. The map drawing unit 120 then draws a route in the added road.

According to the above-described first embodiment, the following advantageous effects are produced.

(1) The navigation device includes: the navigation storage unit 102 storing the first main map data 500 divided into zones and used at least for screen display; the map drawing unit 120 generating screen information using the first main map data 500; the difference detecting unit 150 calculating, as the difference evaluation value, the magnitude of the difference in zone between the map information before update and the map information after update; and the main map data updating unit 170 determining the order of the zones on the basis of the magnitude of the difference evaluation value to update, on a zone-by-zone basis, the map information stored in the storage unit.

The first main map data 500 for the zones is updated in order of decreasing difference in zone between the first main map data 500 before update and the first main map data 500 after update, starting with the zone with the largest difference. Thus, when screen information is generated before update is completed, a possible adverse effect of incomplete update can be reduced.

(2) The navigation storage unit 102 stores the version management table 900 indicating the update status of each of the zones. The map drawing unit 120 uses the first main map data 500 and the version management table 900 to generate screen information.

Thus, drawing of a map is varied according to the update status of the zone to be drawn. Consequently, in a case where a zone not completely updated yet is drawn, the possible adverse effect of incomplete update can be reduced.

(3) In a case of referencing the version management table 900 to determine that any of the zones used to generate the screen information has been non-updated, the map drawing unit 120 adds information indicating that update is being performed, to the screen information as illustrated by reference sign 103A and reference sign 103B in FIG. 10.

Display of "updating" on the display unit 103 allows the user to assume that the display on the display unit 103 is different from the real situation of surroundings. Thus, the user can be prevented from being confused.

(4) In a case of referencing the version management table 900 to determine that any of the zones used to generate the screen information has been non-updated, the map drawing unit 120 generates screen information for the zone on the basis of the magnitude of the difference evaluation value for the zone. That is, as illustrated in FIG. 16, the screen information is generated by the technique varying depending on whether the difference evaluation value is 100 or more or less than 100. Thus, screen information providing no uncomfortable feeling can be generated on the basis of the magnitude of the difference evaluation value.

(5) The navigation device 100 includes the route calculating unit 140 calculating the traveling route to the destination using the first route calculation data 700. The difference detecting unit 150 calculates the difference evaluation value for the zones including the traveling route calculated by the route calculating unit.

Thus, map information having higher level of importance for the user viewing, that is, map information for the zones including the traveling route, can be updated in order of decreasing difference in zone starting with the zone with the largest difference.

(6) The map updating system 1 includes the navigation device 100 mounted in the vehicle and the distribution server 200 distributing information to the navigation device 100. The navigation device 100 includes the navigation storage unit 102 storing the first main map data 500 divided into zones and used at least for screen display, the map drawing unit 120 generating screen information using the first main map data 500, and the main map updating unit 170 updating the map information stored in the navigation storage unit 102. The distribution server 200 includes the server storage unit 202 storing the latest map information used to update the map information. The order of the zones used when the main map data updating unit 170 updates the map information is determined on the basis of the difference evaluation value indicative of the magnitude of the difference between the map information before update and the map information after update.

(7) The navigation device 100 includes the difference detecting unit 150 calculating the difference evaluation value. The main map data updating unit 170 of the navigation device 100 determines the order of the zones to be updated on the basis of the magnitude of the difference evaluation value, transmits, to the distribution server 200, update zone information indicative of the zones to be updated, and updates the map information on the basis of the latest map information for the zones received from the distribution server 200. The distribution server 200 includes the main map data distributing unit 270 extracting, from a latest map storage unit, the latest map information for the zones identified by the update zone information and transmitting the latest map information to the navigation device 100.

MODIFIED EXAMPLE 1

Navigation may be started before the main map data updating unit 170 updates the first main map data 500. That is, in FIG. 11, completion of step S1603 may cause the navigation unit 107 to start navigation.

MODIFIED EXAMPLE 2

The data updated before the main map data updating unit 170 starts navigation may be information other than information about the zone including the user's home. The following information may be updated before start of navigation: information not necessarily needed for calculation of the route but needed to deal with a variety of route searches, for example, expressway toll information.

MODIFIED EXAMPLE 3

The main map data updating unit 170 may end the background update in a case where no difference data 420 are present in the non-updated zones because all the zones included in the route calculation data 410 have been updated or the own vehicle has reached the destination to end the guidance.

Figure 17:
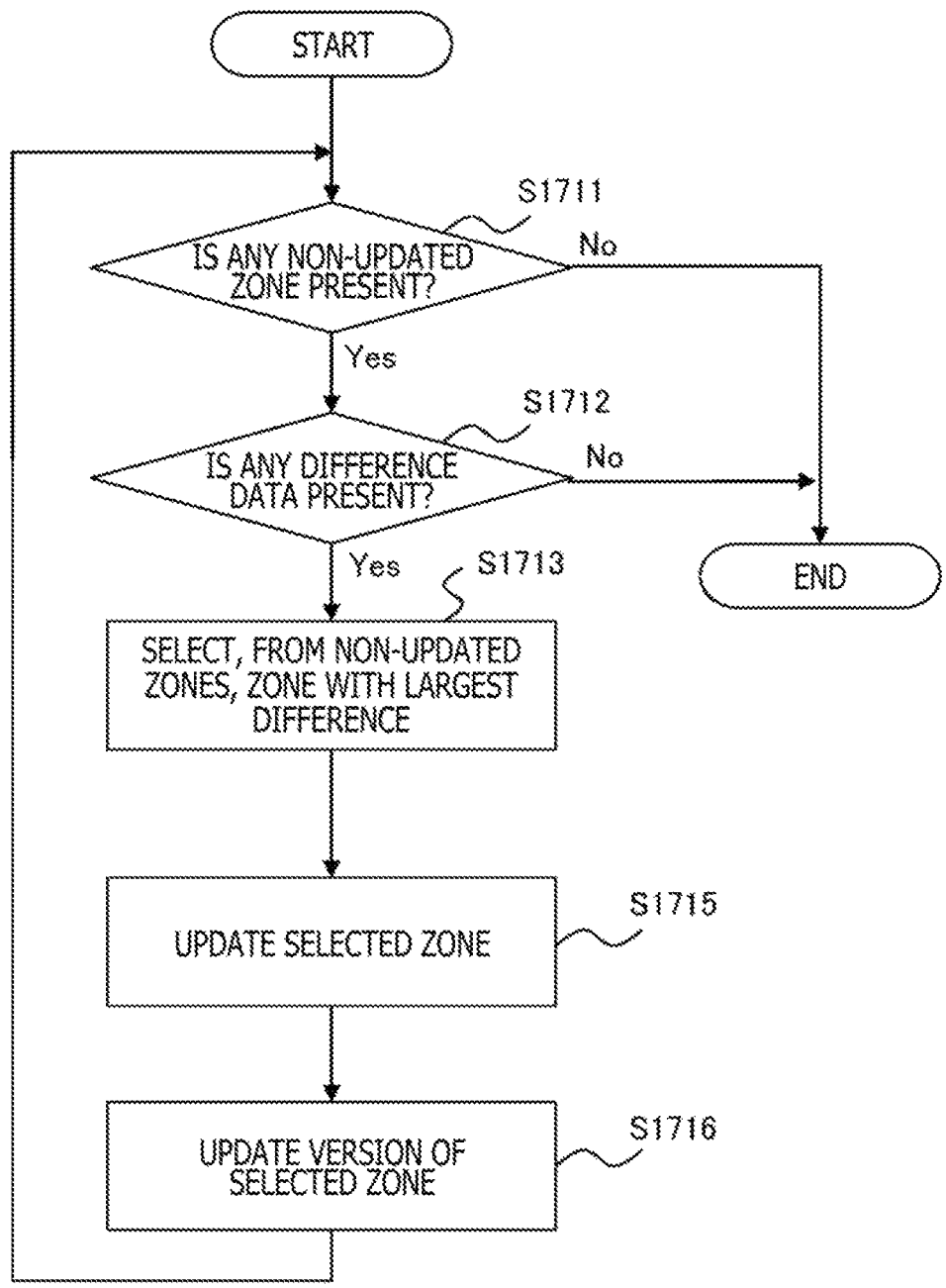
FIG. 17 is a flowchart illustrating a background updating process for the main map data executed by the main map data updating unit 170 in Modified Example 3.

FIG. 17 is a flowchart illustrating the background updating process for the main map data executed by the main map data updating unit 170 in Modified Example 3. FIG. 17 corresponds to the flowchart illustrated in FIG. 15 which is changed as follows. That is, in a case where the determination in step S1712 is negative, the process ends instead of proceeding to step S1714. This is because, in a case where communication by the navigation communication unit 105 is based on a contract needing payment of fee corresponding to a communication volume, that is, what is called a pay-per-use contract, updating the map data other than the data about the traveling route may be less cost-effective.

This modified example produces the following advantageous effects.

(1) The navigation device 100 includes the guidance unit 130 detecting arrival at the destination. The main map data updating unit 170 updates the first main map data 500 for the zones for which the difference evaluation value has been calculated, in order of decreasing difference evaluation value for the zone starting with the zone with the largest difference evaluation value. When the guidance unit 130 detects arrival at the destination, the guidance unit 130 notifies the main map data updating unit 170 of the arrival as illustrated at S1104 in FIG. 12, and thus, the main map data updating unit 170 makes negative determination in step S1712 in FIG. 15 to end the update of the map information. Thus, the zones in the first main map data 500 needed for guidance along the route can be exclusively updated.

MODIFIED EXAMPLE 4

The technique in which the difference detecting unit 150 detects the difference between the first main map data 500 and the first route calculation data 700 is not limited to the above-described technique. For example, a known technique such as OpenLR or AGORA-C may be used.

MODIFIED EXAMPLE 5

The difference detecting unit 150 may compare the first route calculation data 700 before update with the first route calculation data 700 after update to detect a difference between the first route calculation data 700 before update and the first route calculation data 700 after update. The operations of the difference detecting unit 150 in Modified Example 5 are similar to those in the first embodiment described above. In this case, the route calculation data updating unit 160 stores the second route calculation data 800 acquired from the map distribution server 200, in a storage area in the navigation storage unit 102 that is different from the storage are in the navigation storage unit 102 where the existing first route calculation data 700 is stored.

MODIFIED EXAMPLE 6

The map drawing unit 120 may display, on the display unit 103, "acquiring map information," "not updated," "none-latest map information in use," or "create map by synthesis" instead of "updating."

Second Embodiment

With reference to FIGS. 18 to 22, a second embodiment of the map updating system will be described. In the description below, the same components as those in the first embodiment are denoted by the same reference signs, and differences from the first embodiment will mainly be described. Undescribed aspects are the same as the corresponding aspects in the first embodiment. The present embodiment is mainly different from the first embodiment in that the map distribution server executes part of the functions executed by the navigation device in the first embodiment.

Figure 18:
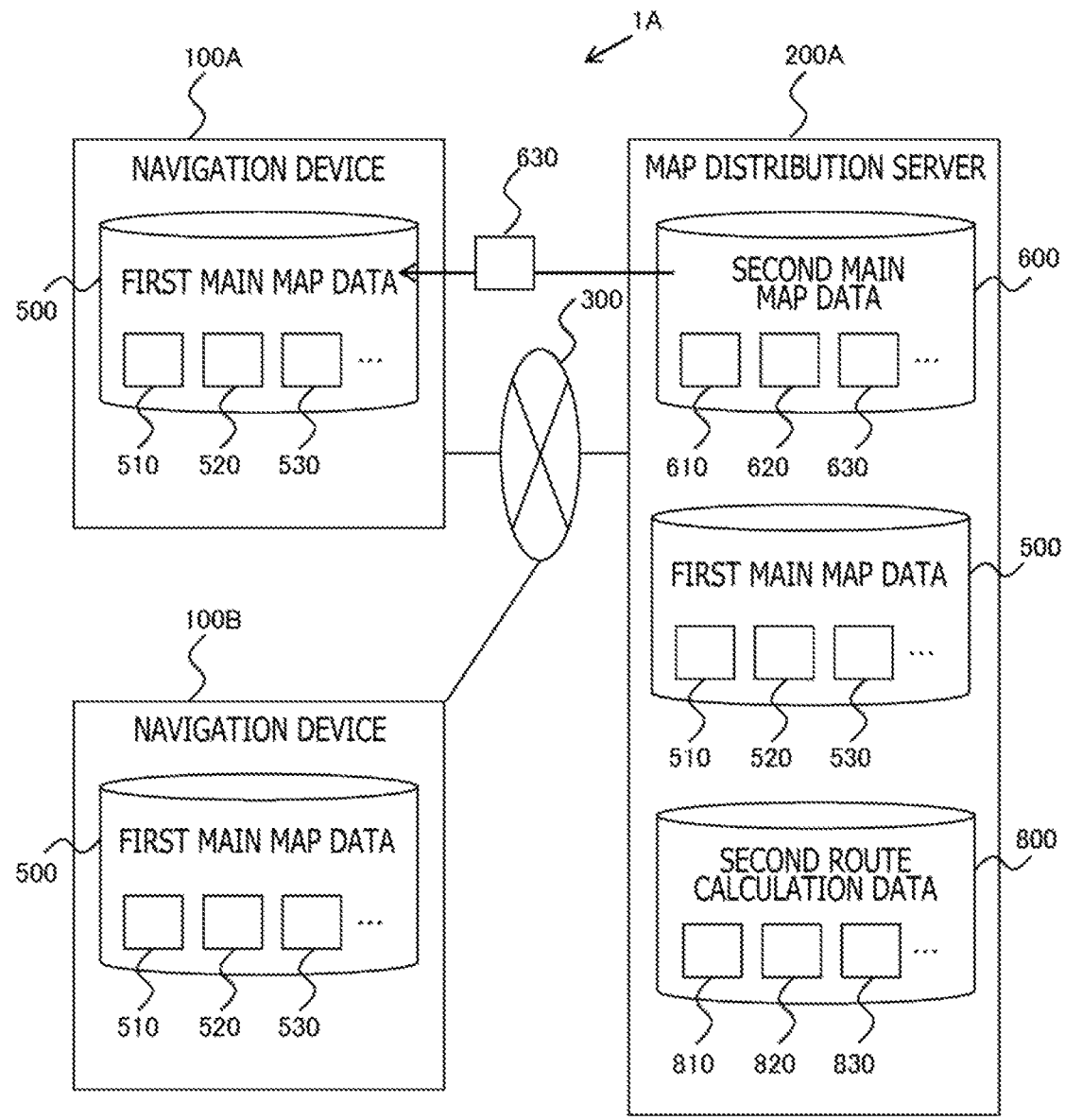
FIG. 18 is a diagram of an entire configuration of a map updating system 1A in a second embodiment.

FIG. 18 is a diagram of an entire configuration of a map updating system 1A in the second embodiment. The map updating system 1A includes a navigation device 100A, a navigation device 100B, and a map distribution server 200A connected together via a communication network 300. The navigation device 100A stores the first main map data 500. The map distribution server 200A stores the first main map data 500 in addition to the second main map data 600 and the second route calculation data 800. The contents of the main map data and the route calculation data in the second embodiment are similar to those in the first embodiment. FIG. 18 illustrates only two navigation devices. However, the map updating system 1A may include three or more navigation devices or only one navigation device. The navigation device 100A and the navigation device 100B are identical except for the version of the stored first main map data 500. Thus, only the configuration and operation of the navigation device 100A will described below.

Figure 19:
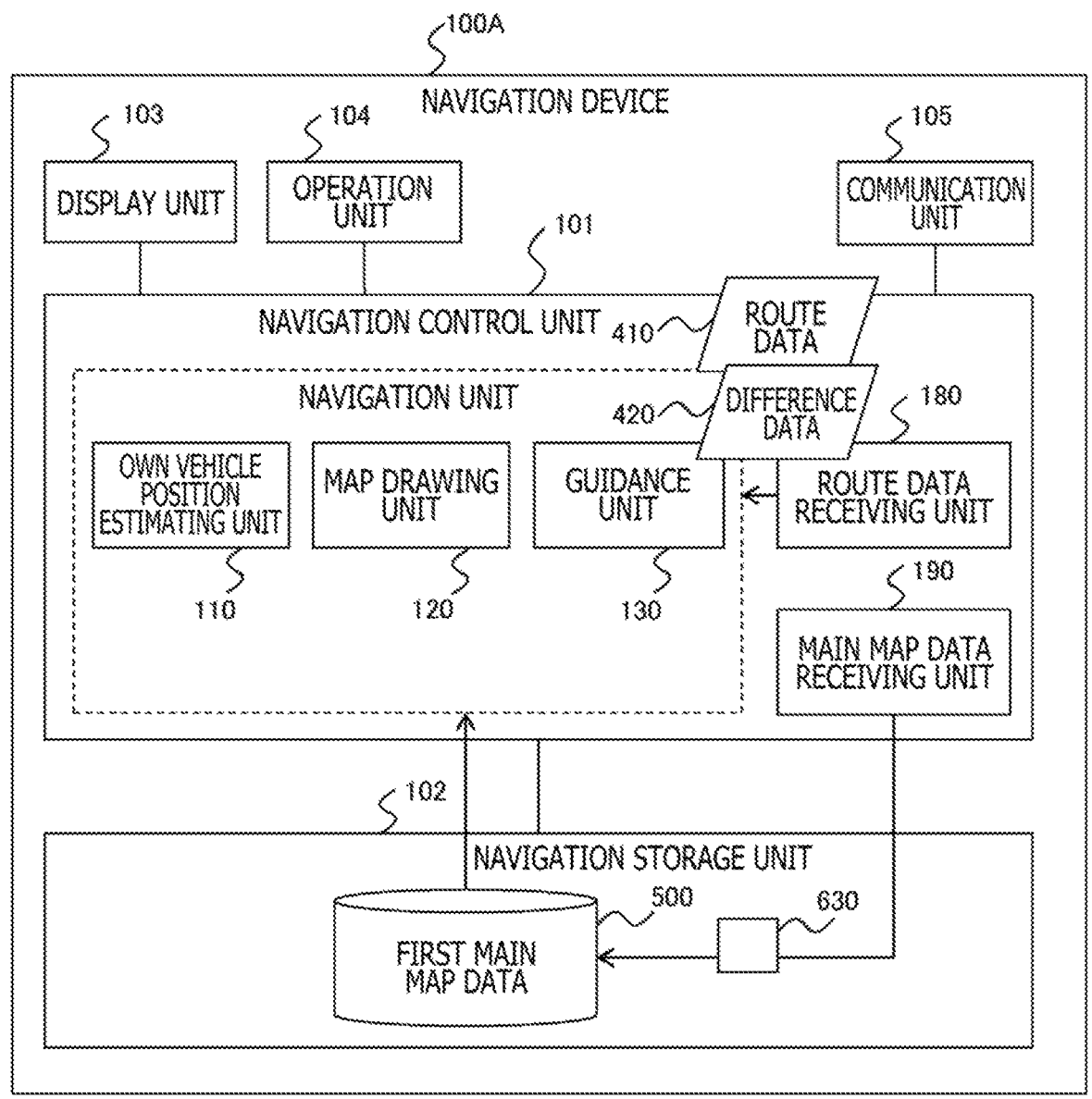
FIG. 19 is a diagram of a configuration of a navigation device 100A in the second embodiment.

FIG. 19 is a diagram of a configuration of the navigation device 100A in the second embodiment. The navigation device 100A corresponds to the configuration of the navigation device 100 in the first embodiment from which the route calculating unit 140, the difference detecting unit 150, the route calculation data updating unit 160, and the main map data updating unit 170 are removed and to which a route data receiving unit 180 and a main map data receiving unit 190 are added. The route data receiving unit 180 receives the route data 410 and the difference data 420 from the map distribution server 200A to notify the own vehicle position estimating unit 110, the map drawing unit 120, and the guidance unit 130 of the route data 410 and the difference data 420. The main map data receiving unit 190 saves the second main map data 600 received from the map distribution server 200A, to the navigation storage unit 102 as the first main map data 500. The other components of the navigation device 100A in the second embodiment are similar to those of the navigation device in the first embodiment.

Figure 20:
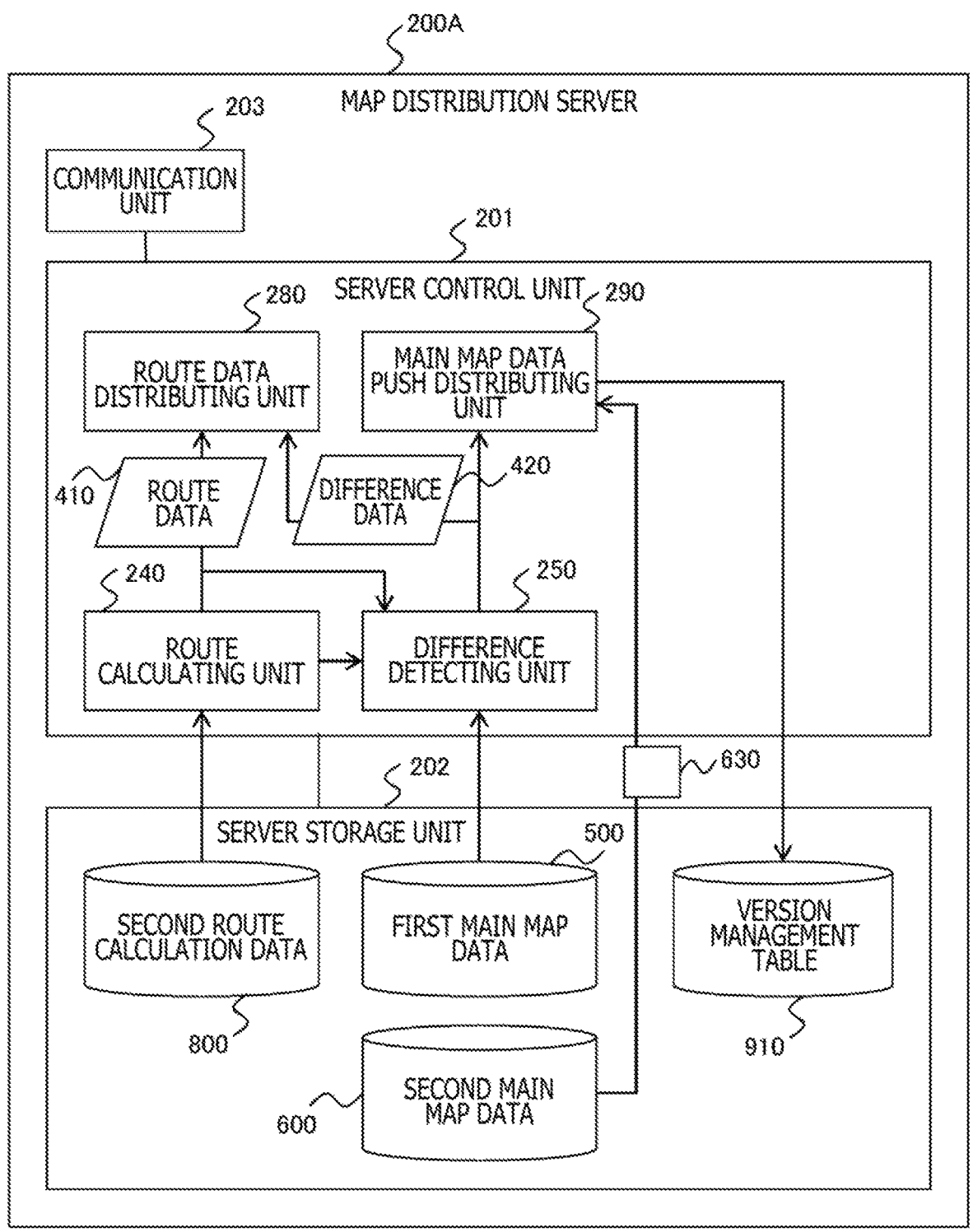
FIG. 20 is a diagram of a configuration of a map distribution server 200A in the second embodiment.

FIG. 20 is a diagram of a configuration of the map distribution server 200A in the second embodiment. A comparison of the map distribution server 200A with the map distribution server 200 in the first embodiment indicates that the map distribution server 200A corresponds to the map distribution server 200 from which the route calculation data distributing unit 260 and the main map data distributing unit 270 are removed and to which a route calculating unit 240, a difference detecting unit 250, a route data distributing unit 280 and a main map data push distributing unit 290 are added. Operations of the route calculating unit 240 and the difference detecting unit 250 are similar to the operations of the route calculating unit and the difference detecting unit in the first embodiment. When receiving a request from the route data receiving unit 180 of the navigation device 100A, the route data distributing unit 280 acquires the route data 410 from the route calculating unit 240, acquires the difference data 420 from the difference detecting unit 250, and transmits the route data 410 and the difference data 420 to the route data receiving unit 180 of the navigation device 100A.

The main map data push distributing unit 290 distributes the second main map data 600 to the navigation device 100A on a zone-by-zone basis. The navigation device 100A receives the second main map data 600 to update the first main map data 500. Furthermore, the map distribution server 200A in the second embodiment further stores a version management table 910 in the navigation storage unit 102. The version management table 910 manages the version of the second route calculation data 800 stored in the map distribution server 200A, the version of the first main map data 500 stored in the navigation device 100A, and the version of the first main map data 500 stored in the navigation device 100B. The configurations of the individual map data and the contents of the stored data, the second embodiment are similar to those in the first embodiment.

FIG. 21 is a diagram illustrating a configuration of the version management table 910 stored in the navigation storage unit 102 of the map distribution server 200A in the second embodiment. The version management table 910 is composed of a plurality of records, and each of the records is composed of fields of a device 911, a zone 912, and a version 913. The field of the device 911 stores a name of a device to identify information for which the field is intended. For example, the record in which the field of the device 911 stores the "map distribution server 200A" indicates the version of the second route calculation data 800 in the map distribution server 200A. Furthermore, the records in which the fields of the device 911 store the "navigation device 100A" and the "navigation device 100B" respectively indicate the versions of the first main map data 500 in the navigation device 100A and the navigation device 100B. The fields of the zone 912 and the version 913 are similar to the zone 902 and the version 903 in the first embodiment.

Figure 22:
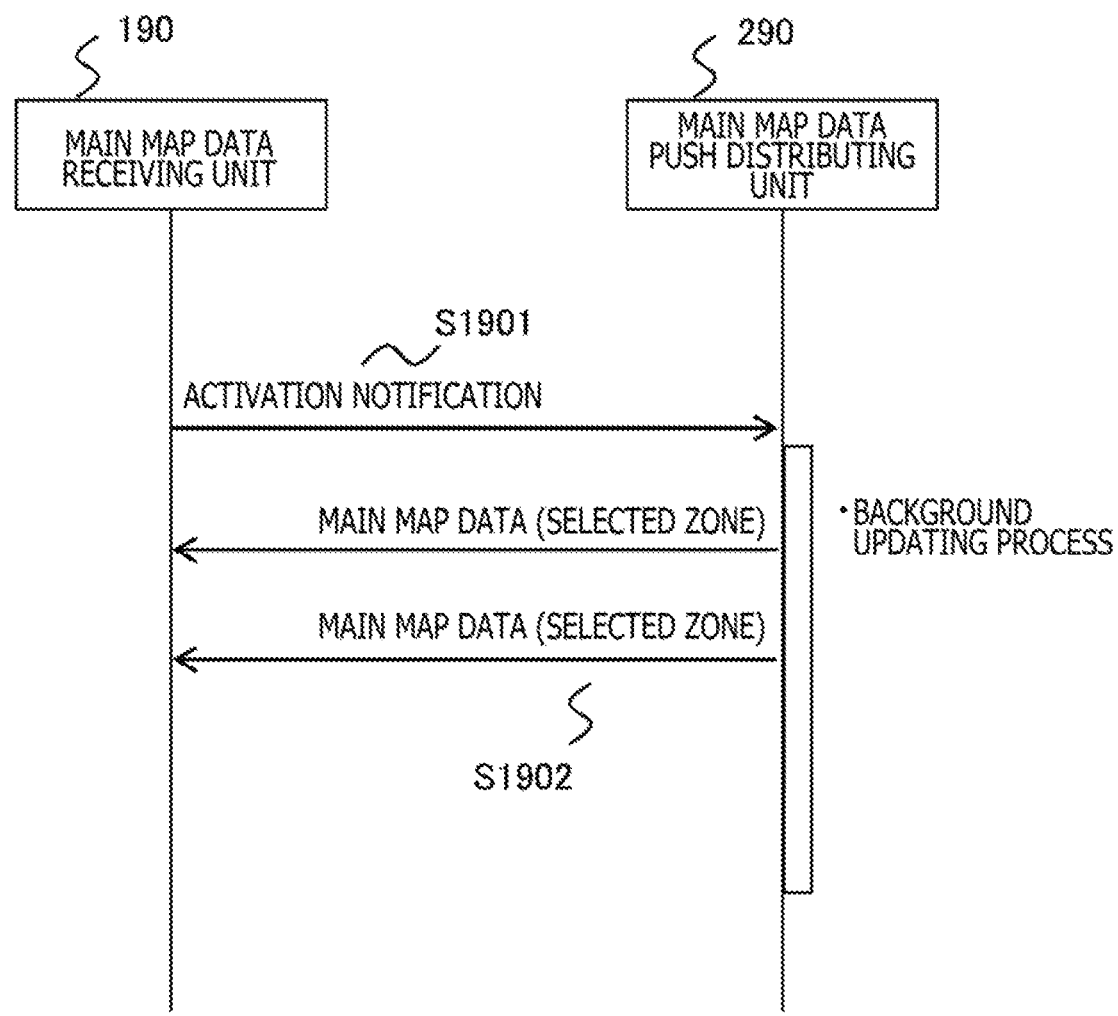
FIG. 22 is a diagram of an operational sequence of a map distribution server 200A.

FIG. 22 is a diagram illustrating an entire sequence of an operation of distributing the main map data from the map distribution server 200A. When the navigation device 100A is activated, the main map data receiving unit 190 transmits, to the main map data push distributing unit 290 of the map distribution server 200A, an activation notification that is a notification indicating that the navigation device 100A has been activated (step S1901). The main map data push distributing unit 290 receives the activation notification and then executes a process described below to transmit the second main map data 600 to the navigation device 100A in units of zones (step S1902). This process is similar to the operations of the main map data update unit 170 described in the first embodiment with reference to FIG. 15, and includes a process of transmitting the main map data for the selected zone to the main map data receiving unit 190, which process replaces the process of updating the selected zone in step S1715 in FIG. 15.

The process described using FIGS. 18 to 22 allows navigation to be continued even in a case where communication is disconnected during a map updating process, as is the case with the first embodiment. The process also enables a reduction in the functions needed for the navigation device 100A side and in the capacity of the navigation storage unit 102.

The above-described second embodiment produces the following advantageous effects.

(1) The distribution server 200A includes the server storage unit 202 storing the first main map data 500, the difference detecting unit 250 calculating the difference evaluation value, and the map distributing unit transmitting the latest map information to the navigation device 100A on a zone-by-zone basis in the order based on the magnitude of the difference evaluation value, that is, the main map data push distributing unit 290. The main map data receiving unit 190 of the navigation device 100 updates the map information stored in the navigation storage unit 102 using the latest map information for each zone transmitted by the main map data push distributing unit 290. This allows the configuration of the navigation device 100A to be simplified and enables a reduction in the process by the navigation device 100A.

Third Embodiment

With reference to FIG. 23, a third embodiment of the map updating system will be described. In the description below, the same components as those in the first embodiment are denoted by the same reference signs, and differences from the first embodiment will mainly be described. Undescribed aspects are the same as the corresponding aspects in the first embodiment. The present embodiment is mainly different from the first embodiment in that traffic attribute information is added to the main map data and the route calculation data and taken into account for difference evaluation.

The configuration of the map updating system 1 in the third embodiment is similar to that in the first embodiment. The third embodiment is different from the first embodiment in information stored in the first route calculation data 700 and the second route calculation data 800 and in the calculation method for the difference evaluation value executed by the difference detecting unit 150.

FIG. 22 is a diagram illustrating an example of first route calculation data 700A in the third embodiment. A traffic attribute of each node is stored in the first route calculation data 700A, in addition to the coordinates of the node in the corresponding zone and information about one or more neighbor nodes. The traffic attribute is information about traffic that can be used for route calculation, for example, a road type, a speed limit, and a passage. The road type is an attribute indicative of the type of a road, for example, a national road, a prefectural road, or an expressway. The speed limit is an attribute indicative of a limit on the maximum speed of vehicles, for example, 40 km per hour or slow driving. The passage is an attribute indicative of a direction in which the vehicle can pass through the node, for example, straight through only or right turn prohibition. Although not described below, the traffic attribute is similarly added to the first main map data 500.

The difference detecting unit 150 also evaluates whether traffic attributes are the same or different in calculating the difference evaluation value. For example, in step S1505 in FIG. 13, the traffic attribute of the process node P is compared with the traffic attribute of the neighbor node Q, and in a case where the traffic attributes are different from each other, a predetermined value is added to the node difference 426. For example, a predetermined value F1 is added in a case of a difference in road type, a predetermined value F2 is added in a case of a difference in speed limit, and a predetermined value F3 is added in a case of a difference in passage. Although F1 to F3 may be the same value, in view of the magnitudes of effects of these traffic attributes on driving of the vehicle, a magnitude relationship F3>F2>F1 is desirable.

According to the above-described third embodiment, the difference evaluation value for each zone can be calculated with the traffic attribute taken into account. Thus, for example, priority can be given to updating of a zone including a node where a right turn is newly prohibited due to a change in traffic regulation.

In the above description, the program is stored in the unillustrated ROM. However, the program may be stored in the navigation storage unit 102. Furthermore, the navigation device 100 may include an unillustrated input/output interface such that the program is loaded from another device into the navigation device 100 as necessary via a medium that can be utilized by the input/output interface and the navigation device 100. Here, the medium refers to, for example, a storage medium removably mounted in the input/output interface or a communication medium, that is, a wired network, a wireless network, or an optical network, or a carrier wave or a digital signal propagating through the network. Furthermore, some or all of the functions implemented by the program may be realized by a hardware circuit or an FPGA.

The above-described embodiments and modified examples may be combined together.

The various embodiments and modified examples have been described. However, the present invention is not limited to the contents of the above description. Other possible aspects within the range of technical ideas of the present invention are also included in the scope of the present invention.

The disclosed contents of the basic priority application below are incorporated herein by reference.

Japanese Patent Application No. 2017-062055 (filed on Mar. 28, 2017)

REFERENCE SIGNS LIST 1, 1A: Map updating system
56: Main map data
78: Route calculation data
100: Navigation device
101: Navigation control unit
102: Navigation storage unit
103: Display unit
107: Navigation unit
120: Map drawing unit
130: Guidance unit
140: Route calculating unit
150: Difference detecting unit
170: Main map data updating unit
190: Main map data receiving unit
200: Map distribution server
201: Server control unit
202: Server storage unit
240: Route calculating unit
250: Difference detecting unit
270: Main map data distributing unit
280: Route data distributing unit
290: Main map data push distributing unit
500: First main map data
600: Second main map data
700: First route calculation data
800: Second route calculation data
900: Version management table

The invention claimed is:

1. An in-vehicle device comprising:
one or more processors and one or more non-transitory computer-readable storage media, the non-transitory computer-readable storage media having stored thereon at least:
instructions for storing map information divided into zones and used at least for screen display;
instructions for generating screen information using the map information;
instructions for calculating, as a difference evaluation value, a magnitude of a difference in a zone between the map information before update and the map information after update; and
instructions for determining an order of updating the zones on a basis of a magnitude of the difference evaluation value to update, for each of the zones, wherein the magnitude of a difference comprises a branching difference.

2. The in-vehicle device according to claim 1, wherein
the version information is stored indicating an update status of each of the zones, and
the map information and the version information are used to generate the screen information.

3. The in-vehicle device according to claim 2, wherein
in a case of referencing the version information to determine that a zone among the zones, being used to generate the screen information, has not been updated, information indicating that update is being performed, is added to the screen information.

4. The in-vehicle device according to claim 2, wherein
in a case of referencing the version information to determine that a zone among the zones, being used to generate the screen information, has not been updated, the screen information is generated on a basis of a magnitude of the difference evaluation value.

5. The in-vehicle device according to claim 1, further comprising:
instructions for calculating a traveling route to a destination,
and calculating the difference evaluation value for a zone among the zones.

6. The in-vehicle device according to claim 5, further comprising:
detecting arrival at the destination,
and updateing the map information for the zones for which the difference evaluation value has been calculated, in order of decreasing magnitude of the difference evaluation value starting with the zone with a largest difference evaluation value, and ending update of the map information upon arrival at the destination.

7. The map updating system according to claim 1, wherein the magnitude of a difference comprises at least a node difference.

8. A map updating system comprising a navigation device mounted in a vehicle and a distribution server distributing information to the navigation device,
the navigation device including one or more processors and one or more non-transitory computer-readable storage media, the non-transitory computer-readable storage media having stored thereon at least:
instructions for storing map information divided into zones and used at least for screen display;
instructions for generating screen information using the map information; and
instructions for updating, for each of the zones, the map information, the distribution server including latest map information used to update the map information, wherein an order of updating the zones used when updating the map information is determined on a basis of a difference evaluation value indicative of a magnitude of a difference between the map information before update and the map information after update, wherein the magnitude of a difference comprises a branching difference.

9. The map updating system according to claim 8, wherein the magnitude of a difference comprises at least a node difference.

10. The map updating system according to claim 8, wherein
the navigation device further comprises instructions for calculating the difference evaluation value, and
the navigation device determines the order of updating the zones on a basis of a magnitude of the difference evaluation value, transmits, to the distribution server, update zone information indicative of the zones to be updated, and updates the map information on a basis of the latest map information for the zones, the latest map information being received from the distribution server, and
the distribution server further extracts, the latest map information for the zones identified by the update zone information and transmitting the latest map information to the navigation device.

11. The map updating system according to claim 8, wherein
the distribution server further comprises instructions for calculating the difference evaluation value, and instruction for transmitting, to the navigation device, the latest map information for each of the zones in an order based on a magnitude of the difference evaluation value, and
the navigation device uses the latest map information for each of the zones, to update the map information.

* * * * *